(12) United States Patent
Federschmidt et al.

(10) Patent No.: US 12,182,151 B1
(45) Date of Patent: Dec. 31, 2024

(54) FRAMEWORK FOR MANAGING DYNAMIC CONFIGURATIONS OF DATA INTAKE AND QUERY SYSTEMS DEPLOYED IN REMOTE COMPUTING ENVIRONMENTS

(71) Applicant: SPLUNK Inc., San Francisco, CA (US)

(72) Inventors: Daniel Federschmidt, Wuppertal (DE); Ashley Hoang, Fairfax Station, VA (US); Yuan Ling, Jersey City, NJ (US); Mayur Sanjaybhai Pipaliya, San Francisco, CA (US); Nicolas Stone, Elk Grove, CA (US); Carl Yestrau, San Francisco, CA (US)

(73) Assignee: Splunk Inc., San Jose, CA (US)

( * ) Notice: Subject to any disclaimer, the term of this patent is extended or adjusted under 35 U.S.C. 154(b) by 143 days.

(21) Appl. No.: 18/104,142

(22) Filed: Jan. 31, 2023

Related U.S. Application Data

(63) Continuation-in-part of application No. 17/703,786, filed on Mar. 24, 2022, now Pat. No. 11,947,614, which is a continuation of application No. 16/528,287, filed on Jul. 31, 2019, now Pat. No. 11,314,761.

(51) Int. Cl.
  *G06F 16/00*    (2019.01)
  *G06F 3/0482*   (2013.01)
  *G06F 16/16*    (2019.01)
  *G06F 16/22*    (2019.01)
  (Continued)

(52) U.S. Cl.
  CPC .......... *G06F 16/252* (2019.01); *G06F 3/0482* (2013.01); *G06F 16/168* (2019.01); *G06F 16/2272* (2019.01); *G06F 16/2471* (2019.01)

(58) Field of Classification Search
  CPC .............. G06F 16/168; G06F 16/2272; G06F 16/2471; G06F 16/252; G06F 16/9538; G06F 3/0482
  See application file for complete search history.

(56) References Cited

U.S. PATENT DOCUMENTS

| 10,055,470 B1 * | 8/2018 | Manzo | .......... G06F 16/256 |
| 2019/0097902 A1 * | 3/2019 | Hardin | .......... H04L 43/0817 |

(Continued)

OTHER PUBLICATIONS

Raman Grover et al., "Data Ingestion in AsterixDB," 18th International Conference on Extending Database Technology (EDBT), Mar. 23-27, 2015, pp. 1-12. (Year: 2015).*

(Continued)

*Primary Examiner* — Cheryl Lewis
(74) *Attorney, Agent, or Firm* — Rutan & Tucker LLP

(57) ABSTRACT

Implementations of this disclosure provide for automated monitoring of configuration parameters of a primary data intake and query system instance operating within a distributed deployment environment. Further implementations provide for automatically generating instructions in response to a detected change in a configuration parameter of the primary data intake and query system instance and transmitting those instructions to one or more secondary data intake and query system instances. The instructions, upon execution by one or more processors, cause the configuration parameters of the one or more secondary data intake and query system instances to be updated in accordance with the detected change in the configuration parameter of the primary data intake and query system instance.

20 Claims, 22 Drawing Sheets

(51) Int. Cl.
    *G06F 16/2458*    (2019.01)
    *G06F 16/25*      (2019.01)

(56) References Cited

U.S. PATENT DOCUMENTS

2020/0065303 A1   2/2020  Bhattacharjee et al.
2020/0364223 A1  11/2020  Pal et al.

OTHER PUBLICATIONS

Xikui Wang et al., An IDEA: An Ingestion Framework for Data Enrichment in AsterixDB (Extended Version), arVirpreprintarXiV.org, Proceedings of the FLDB Endowment, vol. 12, No. 11, 2010, pp. 1-21. (Year: 2010).*

* cited by examiner

FIG. 5B

| Select | Options | Time | Security Domain | Title | Urgency | Status | Owner | |
|---|---|---|---|---|---|---|---|---|
| ☐ | ▶ | 8/26/12 11:11:03.000 AM | Access ▼ | Insecure Or Cleartext Authentication Detected ▼ | ⊙High ▼ | New ▼ | Unassigned ▼ | View details |
| ☐ | ▶ | 8/26/12 11:10:07.000 AM | Access ▼ | Insecure Or Cleartext Authentication Detected ▼ | ⊙High ▼ | New ▼ | Unassigned ▼ | View details |
| ☐ | ▶ | 8/26/12 11:00:39.000 AM | Access ▼ | Account (blinebry) Deleted On (PROD-POS-001) ▼ | ⊙High ▼ | New ▼ | Unassigned ▼ | View details |

Incident Review | Actions ▼

Status:
Urgency: high
Owner:

Security domain:
Governance: pci
Search:

511

24 hour window ▶
Last 15 minutes
Last 60 minutes
Last 4 hours
Last 24 hours
Last 7 days
Last 30 days
Last year
Real-time
Other
All time
Custom time...

512

513

514

Environments
5 environments being monitored

| | Name | Management Server | Web Server | Errors | Status | Actions |
|---|---|---|---|---|---|---|
| > | ES Nightly 1 | https://sv.com:1234 | http://server.sv.com:5678 | ⟋ ──── ○ | ⚠ Warning | Edit ⌄ |
| ⌄ | ES Nightly 2 | https://sv.com:123456 | http://server.sv.com:567891 | ⟋ ──── ○ | ✓ Ok | Edit ⌄ |

Environment  Edit
Username .......... admin
Tags ......... N/A
Searches ⟳
3 searches

| | Label | Errors | Latest Results | Polling Interval (Sec) | Last Run | Search Time (Sec) | Status | Actions |
|---|---|---|---|---|---|---|---|---|
| > | Notable Events - Generator | N/A | 1544 | 300 | 6 minutes ago | 0.2 | ✓ Ok | Edit ⌄ |
| > | All Notables - Last 24 hours | N/A | 1563 | 300 | 6 minutes ago | 3.666 | ✓ Ok | Edit ⌄ |
| > | Notable Events By Urgency - Generator | N/A | 1 | 300 | 6 minutes ago | 0.187 | ✓ Ok | Edit ⌄ |

*FIG. 9A*

| | Label | Errors | Latest Results | Polling Interval (Sec) | Last Run | Search Time (Sec) | Status | Actions |
|---|---|---|---|---|---|---|---|---|
| ⌄ | All Notables - Last 24 hours | N/A | 1213 | 300 | 8 minutes ago | 3.155 | ✓ Ok | Edit ⌄ |

Search Run ⟋
String............. earliest=-24h'notable' | searchNOT'suppresion' | table _time, security_domain, rule_title, urgency, status_label, owner,
bogon_ip, dest, transport, dest_port, threat_match_value, signature, src, process, infected_hosts, service, dvc, user, event_id,
threat activity
Type................ template
Persistence .......... CSV Lookup ⓘ

Index Edit ⟋
Name ............. es_https_sv_com_1234_56789-ABCD-123-abc-4567890
Event Count ...... 0 ⟋
Lastest Event ..... N/A
Earliest Event .... N/A
Size ................ 976.56 KB HTTP Event Collector (HEC) Edit ⟋
Name ............. es_https_sv_com_1234_56789-WXYZ-123-abc-4567890
Token ............. fffd304-55d0-480a-bfdd-8bee13e1b4a8
Token Status ...... ✓ Enabled Look up Edit ⟋
Name ............. es_https_sv_com_1234_56789-EFGH-123-abc-4567890

Search Analytics Datasets Reports Alerts Dashboards

Reports
Reports are based on single searches and can include visualizations, statistics and/or events. Click the name to view the report. Open the report in pivot or Search to refine the parameters or further explore the data.
7 Reports

| Title ⇅ | Actions | Next Scheduled Time ⇅ | Owner ⇅ | App ⇅ | Sharing ⇅ |
|---|---|---|---|---|---|
| > Bucket Merge Retrieve Conf Settings | Open in Search    Edit ▾ | None | nobody | search | App |
| > Errors in the last 24 hours | Open in Search    Edit ▾ | None | nobody | search | App |
| > Errors in the last hour | Open in Search    Edit ▾ | None | nobody | search | App |
| > License Usage Data Cube | Open in Search    Edit ▾ | None | nobody | search | App |
| > Messages by minutes last 3 hours | Open in Search    Edit ▾ | None | nobody | search | App |
| > Orphaned scheduled searches | Open in Search    Edit ▾ | None | nobody | search | App |
| > Splunk errors last 24 hours | Open in Search    Edit ▾ | None | nobody | search | App |

*FIG. 16A*

| Time | Event |
|---|---|
| > 12/22/22 10:11:42.933 PM | 12-22-2022 22:11:42.933+0000 ERROR X509 [4045102 ApplicationUpdateThread] - X509 certificate (CN=splunkbase.splunk.com, O=Splunk Inc., L=San Francisco, ST=California, C=US) common name (splunkbase.splunk.com) did not match any allowed names (apps.splunk.com,sdn.apps.splunk.com)<br>host = so1 \| source = /opt/splunk/var/log/splunk/splunkd.log \| sourcetype = splunkd |
| > 12/22/22 4:09:22.667 AM | 12-22-2022 04:09:22.667+0000 ERROR X509 [3734120 ApplicationUpdateThread] - X509 certificate (CN=splunkbase.splunk.com, O=Splunk Inc., L=San Francisco, ST=California, C=US) common name (splunkbase.splunk.com) did not match any allowed names (apps.splunk.com,sdn.apps.splunk.com)<br>host = so1 \| source = /opt/splunk/var/log/splunk/splunkd.log \| sourcetype = splunkd |
| > 12/22/22 4:07:44.721 AM | 12-22-2022 04:07:44.721+0000 ERROR X509 [3733552 ApplicationUpdateThread] - X509 certificate (CN=splunkbase.splunk.com, O=Splunk Inc., L=San Francisco, ST=California, C=US) common name (splunkbase.splunk.com) did not match any allowed names (apps.splunk.com,sdn.apps.splunk.com)<br>host = so1 \| source = /opt/splunk/var/log/splunk/splunkd.log \| sourcetype = splunkd |
| > 12/22/22 4:05:10.089 AM | 12-22-2022 04:04:10.089+0000 ERROR X509 [3732954 ApplicationUpdateThread] - X509 certificate (CN=splunkbase.splunk.com, O=Splunk Inc., L=San Francisco, ST=California, C=US) common name (splunkbase.splunk.com) did not match any allowed names (apps.splunk.com,sdn.apps.splunk.com)<br>host = so1 \| source = /opt/splunk/var/log/splunk/splunkd.log \| sourcetype = splunkd |
| > 12/22/22 4:04:21.580 AM | 12-22-2022 04:04:21.580+0000 ERROR X509 [3732688 ApplicationUpdateThread] - X509 certificate (CN=splunkbase.splunk.com, O=Splunk Inc., L=San Francisco, ST=California, C=US) common name (splunkbase.splunk.com) did not match any allowed names (apps.splunk.com,sdn.apps.splunk.com)<br>host = so1 \| source = /opt/splunk/var/log/splunk/splunkd.log \| sourcetype = splunkd |
| > 12/22/22 4:00:16.154 AM | 12-22-2022 04:00:16.154+0000 ERROR X509 [3731264 ApplicationUpdateThread] - X509 certificate (CN=splunkbase.splunk.com, O=Splunk Inc., L=San Francisco, ST=California, C=US) common name (splunkbase.splunk.com) did not match any allowed names (apps.splunk.com,sdn.apps.splunk.com)<br>host = so1 \| source = /opt/splunk/var/log/splunk/splunkd.log \| sourcetype = splunkd |
| > 12/22/22 3:55:44.729 AM | 12-22-2022 3:55:44.729+0000 ERROR X509 [3728237 ApplicationUpdateThread] - X509 certificate (CN=splunkbase.splunk.com, O=Splunk Inc., L=San Francisco, ST=California, C=US) common name (splunkbase.splunk.com) did not match any allowed names (apps.splunk.com,sdn.apps.splunk.com)<br>host = so1 \| source = /opt/splunk/var/log/splunk/splunkd.log \| sourcetype = splunkd |
| > 12/22/22 3:53:00.899 AM | 12-22-2022 3:53:00.899+0000 ERROR X509 [3727468 ApplicationUpdateThread] - X509 certificate (CN=splunkbase.splunk.com, O=Splunk Inc., L=San Francisco, ST=California, C=US) common name (splunkbase.splunk.com) did not match any allowed names (apps.splunk.com,sdn.apps.splunk.com)<br>host = so1 \| source = /opt/splunk/var/log/splunk/splunkd.log \| sourcetype = splunkd |

Search  Analytics  Datasets  Reports  Alerts  Dashboards

Splunk errors last 24 hours  Save  Save As▾  View  Create Table View  Close

Index="_configtracker"    *1608  1632*    *1610*    Job▾  ▦ ▢ ⌕ ⊕ ⊥  Custom time ▾ Q √3 events (12/21/22 10:15:35.000 PM to 12/22/22 10:15:35.000 PM) No Event Sampling▾    ○ Smart Mode ▾

Events (2)  Pattern  Statistics  Visualization

Format Timeline ▾  − Zoom Out  + Zoom to Selection  ✕ Deselect    1 hour per column List ▾  ✎ Format  20 Per Page ▾

| i | Time | Event |
|---|---|---|

> 12/2/22
10:15:23.482 AM
```
{[-]
  component: ConfigChange
  data: {[-]
    action: update
    changes: [[-]
      {[-]
        properties: [[-]
        {
          name: CN
          name_value: splunkbase@splunk.com
          old_value:
```
*1634*

*1636*

*1638*

```
      ]
    }
  ]
  epoch_time: 1671747323
  modtime: Thu Dec 22 22:15:23 2022
  new_checksum: 0xa8eba1af334b4898
  old_checksum: 0x243c0a03ae08c32e
  old_checksum: 0x243c0a03ae08c32e
  path: /opt/splunk/etc/apps/search/local/savedsearches.conf
}
datetime: 12-22-2022 22:15:23.482 +0000
log_level: INFO
}
show as raw text
host = so1   source = /opt/splunk/var/log/splunk/configuration_change.log   sourcetype = splunk_configuration_change
```

*FIG. 16E*

FRAMEWORK FOR MANAGING DYNAMIC CONFIGURATIONS OF DATA INTAKE AND QUERY SYSTEMS DEPLOYED IN REMOTE COMPUTING ENVIRONMENTS

PRIORITY

This application is a continuation-in-part of U.S. patent application Ser. No. 17/703,786, filed Mar. 24, 2022, now U.S. Pat. No. 11,947,614, which is a continuation of and claims the benefit of priority to U.S. patent application Ser. No. 16/528,287, now U.S. Pat. No. 11,314,761, filed Jul. 31, 2019, the entire of both are incorporated herein.

FIELD

Implementations of the disclosure relate to systems, methods and apparatuses directed to a centralized control system for automatically monitoring changes to configuration parameters of a primary data intake and query system instance, generating instructions upon detection of a change to a configuration parameter at the primary data intake and query system instance that cause secondary data intake and query system instances to update their configuration parameters, and distributing the instructions to one or more secondary data intake and query system instances. More specifically, one implementation of the disclosure relates to a centralized multi-instance deployment control system that operates in a distributed deployment environment and that includes logic to obtain recordation of changes to configuration parameters of the primary data intake and query system instance, determine which secondary data intake and query system instances have corresponding configuration parameters that are to be updated, and transmit instructions that cause updating of the corresponding configuration parameters at the secondary data intake and query system instances.

GENERAL BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include performance data, diagnostic data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it.

Minimally processing the raw data may include segmenting the raw data into predetermined sized blocks and annotating each block with metadata. In particular, one metadata field may be a source type. When these blocks are searched, the source type metadata field may be the basis for selecting one or more configuration files that determine extraction rules. Thus, in order to provide accurate search results, it is imperative that the source type is assigned, and done so accurately, so as to determine the one or more applicable configuration files, and ultimately, the appropriate extraction rules.

As corporations typically have hundreds, if not thousands, of individual data sources that each routinely generate data to be ingested and analyzed, a single corporation may deploy multiple data and intake query system instances that are each configured to ingest and perform processing operations referenced above. One disadvantage currently is that results of search queries performed at each data and intake query system instance are viewed separately, preventing network administrators, IT professionals or otherwise from understanding a complete view of the ingested data and, specifically, results of a search query performed on the data ingested by a plurality of data and intake query system instances. Therefore, although the current technology landscape enables data ingestion and processing using a plurality of data and intake query system instances, there is no centralized hub that automates performance of the search queries, automates polling for and consolidating of search query results, and generates interfaces for a user to view the consolidated results. Instead, viewing search query results is done on an instance-by-instance basis in a silo manner as opposed to consolidated, summary views of search query results obtained from a plurality of data and intake query system instances.

Additionally, each data intake and query system instance may include certain configuration parameters that dictate how analytics are performed, how data is received and processed, where certain data is stored upon receipt and processing, how and when alerts or reports are generated, etc. In a distributed deployment environment in which multiple data intake and query system instances are deployed, e.g., in geographically diverse areas, information systems administrators employed at an enterprise are often tasked with managing these data intake and query system instances. One aspect of managing these instances may be ensuring that all configuration parameters are correct for each respective instance. In some cases, this may mean that all configuration parameters are consistent among the instances. In other cases, this may mean ensuring configuration parameters are set individually or among certain groups.

BRIEF DESCRIPTION OF THE DRAWINGS

The present disclosure is illustrated by way of example, and not limitation, in the figures of the accompanying drawings, in which like reference numerals indicate similar elements and in which:

FIG. 5B is an interface diagram of an example user interface of an incident review dashboard, in accordance with example implementations;

FIG. 9A is an interface diagram of an example user interface displaying a consolidated search query results view, in accordance with example implementations;

FIG. 9B is an interface diagram of an example user interface displaying a consolidated search query results view subject to role-based access control (RBAC) visibility requirements, in accordance with example implementations;

FIG. 15 is an interface diagram of an example user interface displaying information corresponding to configuration tracking perform on a particular data intake and query system instance, in accordance with example implementations;

FIGS. 16A-16E are interface diagrams of example user interfaces displaying information as viewed during adjustment of a configuration parameter of a data intake and query system instance, in accordance with example implementations;

DETAILED DESCRIPTION

Figure 1:
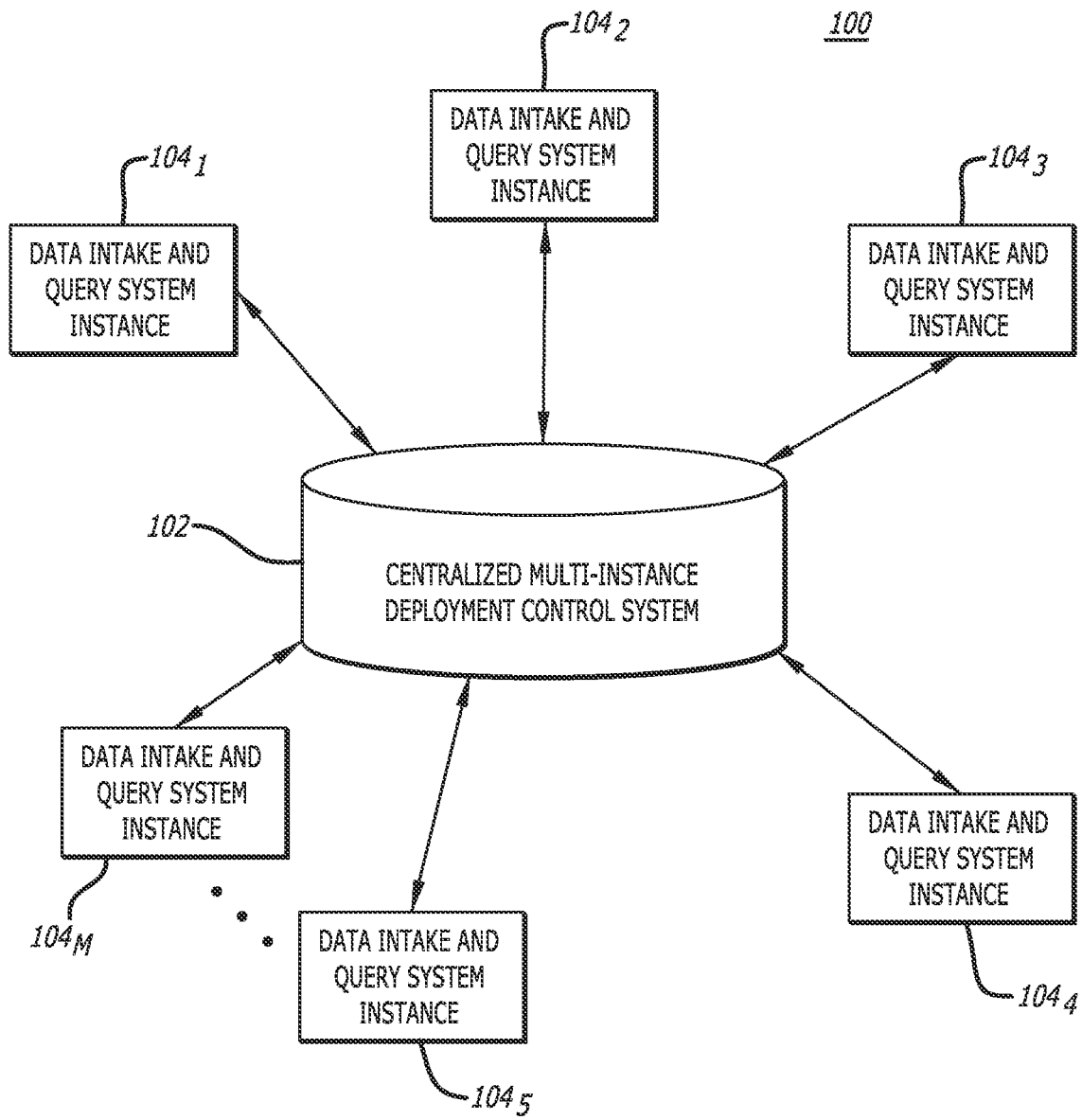
FIG. 1 is a block diagram of an example networked computer environment, in accordance with example implementations.

Implementations are described herein according to the following outline:
   1.0 General Overview
   2.0 Operating Environment
      2.1 Client Devices
      2.2 Data Intake and Query System
      2.3 Cloud-Based System Overview
      2.4 Data Ingestion
         2.4.1 Input
         2.4.2 Parsing
         2.4.3 Indexing
      2.5 Query Processing
      2.6 Pipelined Search Language
      2.7 Security Features
      2.8 Cloud-Based Architecture
      2.9 Centralized Multi-Instance Deployment Control System
         2.9.1 Introduction
         2.9.2 Logical Representation and Exemplary Flow Diagrams
         2.9.3 Display Interfaces 1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, California. The SPLUNK® ENTERPRISE system is the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the data intake and query system, machine data are collected and stored as "events". An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp that is derived from the portion of machine data in the event. A timestamp of an event may be determined through interpolation between temporally proximate events having known timestamps or may be determined based on other configurable rules for associating timestamps with events.

In some instances, machine data can have a predefined format, where data items with specific data formats are stored at predefined locations in the data. For example, the machine data may include data associated with fields in a database table. In other instances, machine data may not have a predefined format (e.g., may not be at fixed, pre-defined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system uses a flexible schema to specify how to extract information from events. A flexible schema may be developed and redefined as needed. Note that a flexible schema may be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp. The system stores the events in a data store. The system enables users to run queries against the stored events to, for example, retrieve events that meet criteria specified in a query, such as criteria indicating certain keywords or having specific values in defined fields. As used herein, the term "field" refers to a location in the machine data of an event containing one or more values for a specific data item. A field may be referenced by a field name associated with the field. As will be described in more detail herein, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file includes one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source type. When events are to be searched based on a particular field name specified in a search, the system uses one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system utilizes a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from events. In some cases, an extraction rule comprises a regular expression, where a sequence of characters form a search pattern. An extraction rule comprising a regular expression is referred to herein as a regex rule. The system applies a regex rule to an event to extract values for a field associated with the regex rule, where the values are extracted by searching the event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some implementations, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources.

2.0 Operating Environment

FIG. 1 is a block diagram of an example networked computer environment 100, in accordance with example implementations. Those skilled in the art would understand that FIG. 1 represents one example of a networked computer system and other implementations may use different arrangements.

As illustrated, the networked computer environment 100 comprises a centralized multi-instance deployment control system 102 that is communicatively coupled to one or more data intake and query system instances (or "instance") $104_1$-$104_M$ (wherein M≥1). In one implementation, the centralized multi-instance deployment control system (or "control system") 102 stores or has access to credential information for each data intake and query system instances $104_1$-$104_M$ in order to automatically establish a communicative coupling with each instance $104_1$-$104_M$. In some implementations, the control system 102 may receive, generate or otherwise access search queries to be performed on one or more instances $104_1$-$104_M$. Following establishment of a communicative coupling with, for example, the instance $104_1$, the control system 102 establishes intervals at which a search query is to be performed at the instance $104_1$. The search query may be stored at the instance $104_1$ or be provided to the instance $104_1$. In some implementations, the search query is stored at the instance the instance $104_1$ and the control system 102 provides updates to the search query when applicable.

The control system 102 then retrieves the search query results (i.e., as a result of polling the instance $104_1$) and store the results locally in storage or in a remote data store. As will be discussed below, the method of storing the search query results ("results") may be dependent on the type of search query that was performed. For example, the results may be stored as an "index," such as when the results are returned in a standardized format recognized by the control system 102 (e.g., when the results are field-searchable, event data generated via a HTTP Event Collector (HEC)). Alternatively, when the results are not returned in a standardized format recognized by the control system 102, the results may be stored as a "lookup."

As the control system 102 may be communicatively coupled to a plurality of instances $104_1$-$104_M$ in a concurrent manner (e.g., the couplings at least partially overlapping in time), the control system 102 may receive search results from a plurality of instances $104_1$-$104_M$. The control system 102 may the generate instructions that, when executed by one or more processors of a client device, cause the rendering of graphical user interfaces (GUIs) that consolidate the search query results received from one or more instances $104_1$-$104_M$. The control system 102 may provide access to search results from particular instances $104_1$-$104_M$ and/or portions of search results based on the authorization associated with users accessing the GUIs. For example, the control system 102 may provide for role-based access control (RBAC) visibility to particular search results or portions thereof may be restricted according thereto, wherein the RBAC visibility is based on credentials of the particular individual attempting to access the search results via the GUIs.

The centralized multi-instance control system 102 and each of the one or more instances $104_1$-$104_M$ may include various data stores (e.g., either consolidated or separate), network interface components and any combination of hardware and software configured to implement the various logical components described herein. In addition, or in the alternative, the centralized multi-instance control system 102 and each of the one or more instances $104_1$-$104_M$ may be comprised of firmware and/or software and be configured to execute on a network device (or otherwise referred to as a computing device). Each network device may include non-transitory, computer-readable storage ("storage") that stores instructions for implementing the various components described herein, one or more hardware processors configured to execute the instructions stored in the one or more memories, and various data repositories in the storage for storing data structures utilized and manipulated by the various components.

The network devices included in environment 100, and any environment discussed below, may be communicatively coupled over one or more networks, which broadly represent one or more LANs, WANs, cellular networks (e.g., LTE, HSPA, 3G, 4G, 5G, and other cellular technologies), and/or networks using any of wired, wireless, terrestrial microwave, or satellite links, and may include the public Internet.

2.1 Client Devices

Figure 2:
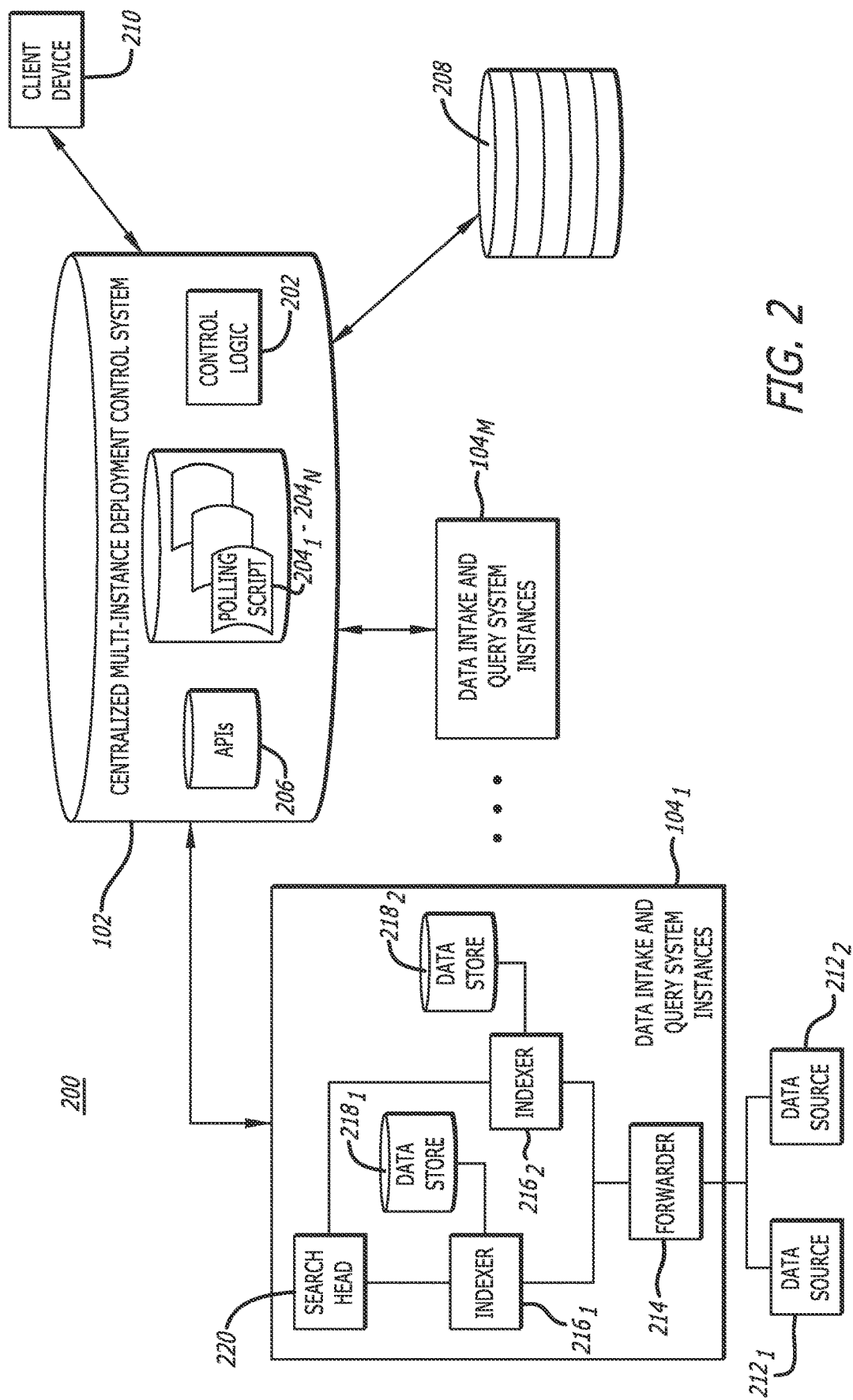
FIG. 2 is a block diagram of a first example centralized multi-instance deployment control system, in accordance with example implementations.

Referring now to FIG. 2, a block diagram of a first example centralized multi-instance deployment control system is shown in accordance with example implementations. The networked computing environment 200 includes the control system 102 and a plurality of instances $104_1$-$104_M$ of FIG. 1, as well as a data store 208 and a client device 210. Although FIG. 2 illustrates only a single client device coupled to the control system 102, a plurality of client devices may be coupled to the control system 102 at any point in time. Client device 210 represents any computing device capable of interacting with the control system 102. Examples of the client device 210 may include, but are not limited or restricted to, a mobile phone, a tablet computer, a handheld computer, a wearable device (e.g., smart watch), a laptop computer, the desktop computer, a server, a portable media players, a gaming device, and so forth. In general, a client device 210 can access the control system 102 to provide search queries, search query updates and receive search query results (e.g., in the form of GUIs).

2.2 Data Intake and Query System

Each of the data intake and query system instances $104_1$-$104_M$ may be event-based systems, such as the SPLUNK® ENTERPRISE system developed by Splunk Inc., of San Francisco, California. The SPLUNK® ENTERPRISE provides for real-time operational intelligence that enables organizations to collect, index, and search machine data from various websites, applications, servers, networks, and mobile devices that power their businesses. A data intake and query system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems. As used herein, a "data intake and query system instance" (or "instance") refers to a single data intake and query system of a distributed deployment wherein typically a plurality of data intake and query systems are operating within a single environment.

During operation, a data intake and query system instance receives machine data from any type and number of sources (e.g., one or more system logs, streams of network packet data, sensor data, application program data, error logs, stack traces, system performance data, etc.). The instance parses the machine data to produce events each having a portion of machine data associated with a timestamp. The instance stores the events in a data store. The instance enables queries to be run against the stored events to, for example, retrieve events that meet criteria specified in a query, such as criteria indicating certain keywords or having specific values in defined fields. As used herein, the term "field" refers to a location in the machine data of an event containing one or more values for a specific data item. A field may be referenced by a field name associated with the field. As will be described in more detail herein, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

Examples of data sources $212_1$-$212_2$ that may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

For purposes of simplicity, the instance $104_1$ will be discussed in detail but such disclosure applies equally to each of the instances $104_1$-$104_M$. The instance $104_1$ includes one or more forwarders 214 that receive data from a variety of input data sources $212_1$-$212_2$, one or more indexers $216_1$-$216_2$ that process and store the data in one or more data stores $218_1$-$218_2$, and a search head 220. Although the figure illustrates a particular number of components, the instance $104_1$ may include, or be coupled to, one or more of each component the disclosure is not limited to the particular number shown.

The forwarder 214 and indexers $216_1$-$216_2$ may comprise separate computer systems, or may alternatively comprise separate processes executing on one or more computer systems. Each data source $212_1$-$212_2$ broadly represents a distinct source of data that can be consumed by the instance $104_1$. During operation, the forwarder 214 identify which indexers $216_1$-$216_2$ receive data collected from a data source $212_1$-$212_2$ and forward the data to the appropriate indexer(s) $216_1$-$216_2$. Forwarders 214 may also perform operations on the data before forwarding, including removing extraneous data, detecting timestamps in the data, parsing data, indexing data, routing data based on criteria relating to the data being routed, and/or performing other data transformations.

In some implementations, the forwarder 214 may comprise a service accessible to client device 210 via a network (such coupling not shown in FIG. 2). For example, one type of forwarder 214 may be capable of consuming vast amounts of real-time data from a potentially large number of client devices 210 and/or other network devices. The forwarder 214 may, for example, comprise a computing device which implements multiple data pipelines or "queues" to handle forwarding of network data to indexers $216_1$-$216_2$. The forwarder 214 may also perform many of the functions that are performed by an indexer. For example, the forwarder 214 may perform keyword extractions on raw data or parse raw data to create events, and optionally, generate time stamps for events. Additionally or alternatively, the forwarder 214 may perform routing of events to indexers $216_1$-$216_2$. The data stores $218_1$-$218_2$ may store events derived from machine data from a variety of sources all pertaining to the same component in an information technology (IT) environment, and this data may be produced by the machine in question or by other components in the IT environment.

2.3 Cloud-Based System Over View

The example data intake and query system instance $104_1$ described in reference to FIG. 2 comprises several components, including the forwarder 214, the indexers $216_1$-$216_2$, and the search head 220. In some environments, the data intake and query system instance $104_1$ may be installed and configured, on a plurality of computing devices or other computing resources, such that one or more software applications operating on distinct computing devices implement some or all of these components.

In some implementations, one or more of the components of the data intake and query system $104_1$ may be provided as a cloud-based service. In this context, a cloud-based service refers to a service hosted by one more computing resources that are accessible to end users over a network, for example, by using a web browser or other application on a client device configured for interfacing with the remote computing resources. For example, a service provider may provide a cloud-based data intake and query system instance by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

2.4 Data Ingestion

Figure 3:
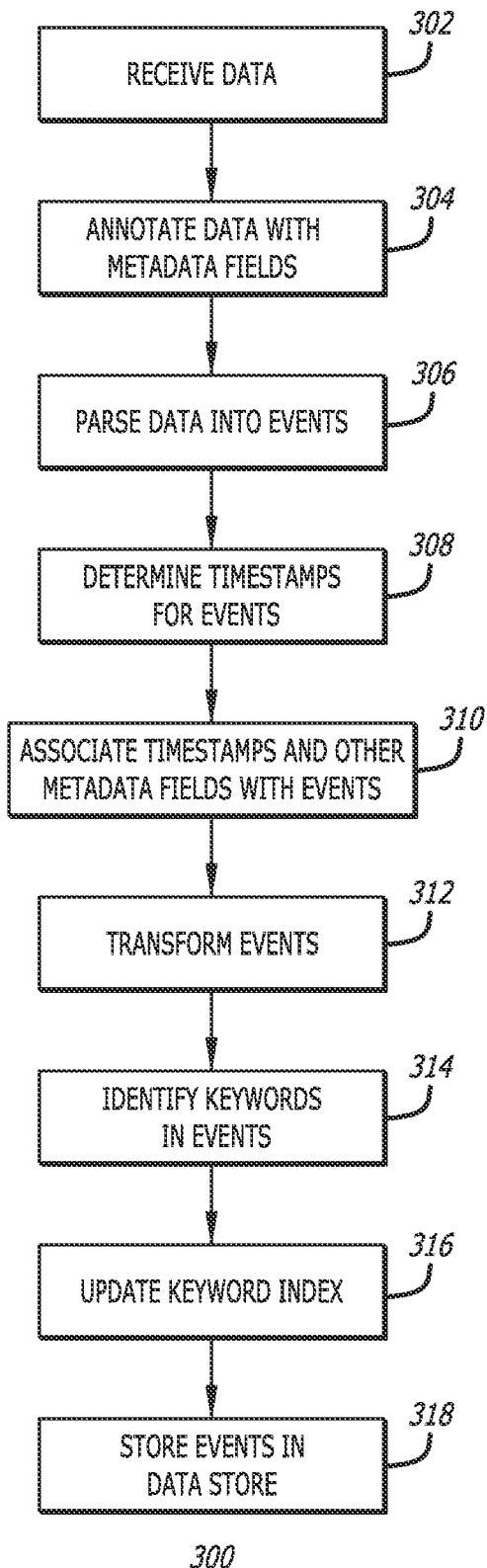
FIG. 3 is a flow diagram of an example method that illustrates how indexers process, index, and store data received from forwarders, in accordance with example implementations.

FIG. 3 is a flow diagram of an example method that illustrates how indexers process, index, and store data received from forwarders, in accordance with example implementations. Each block illustrated in FIG. 3 represents an operation performed in the method 300. The data flow illustrated in FIG. 3 is provided for illustrative purposes only; those skilled in the art would understand that one or more of the steps of the processes illustrated in FIG. 3 may be removed or that the ordering of the steps may be changed. Furthermore, for the purposes of illustrating a clear example, one or more particular system components are described in the context of performing various operations during each of the data flow stages. For example, a forwarder is described as receiving and processing machine data during an input phase; an indexer is described as parsing and indexing machine data during parsing and indexing phases; and a search head is described as performing a search query during a search phase. However, other system arrangements and distributions of the processing steps across system components may be used.

2.4.1 Input

At block 302, a forwarder receives data from an input source, such as the data source $212_1$ of FIG. 2. A forwarder initially may receive the data as a raw data stream generated by the input source. For example, a forwarder may receive a data stream from a log file generated by an application server, from a stream of network data from a network device, or from any other source of data. In some implementations, a forwarder receives the raw data and may segment the data stream into "blocks," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In some implementations, a forwarder forwards the annotated data blocks to another system component (typically an indexer) for further processing.

The data intake and query system allows forwarding of data from one data intake and query instance to another, or even to a third-party system. The data intake and query system can employ different types of forwarders in a configuration. In some implementations, a forwarder may contain the essential components needed to forward data. A forwarder can gather data from a variety of inputs and forward the data to an indexer for indexing and searching. A forwarder can also tag metadata (e.g., source, source type, host, etc.).

In some implementations, a forwarder has the capabilities of the aforementioned forwarder as well as additional capabilities. The forwarder can parse data before forwarding the data (e.g., can associate a time stamp with a portion of data and create an event, etc.) and can route data based on criteria such as source or type of event. The forwarder can also index data locally while forwarding the data to another indexer.

2.4.2 Parsing

At block 306, an indexer receives data blocks from a forwarder and parses the data to organize the data into events. In some implementations, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, the indexer can apply an inferred source type definition to the data to create the events.

At block 308, the indexer determines a timestamp for each event. Similar to the process for parsing machine data, an indexer may again refer to a source type definition associated with the data to locate one or more properties that indicate instructions for determining a timestamp for each event. The properties may, for example, instruct an indexer to extract a time value from a portion of data for the event, to interpolate time values based on timestamps associated with temporally proximate events, to create a timestamp based on a time the portion of machine data was received or generated, to use the timestamp of a previous event, or use any other rules for determining timestamps.

At block 310, the indexer associates with each event one or more metadata fields including a field containing the timestamp determined for the event. In some implementations, a timestamp may be included in the metadata fields. These metadata fields may include any number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to events may, for example, be specified in one or more configuration files and referenced by one or more source type definitions.

While certain default or user-defined metadata fields can be extracted from the machine data for indexing purposes, all the machine data within an event can be maintained in its original condition. As such, in implementations in which the portion of machine data included in an event is unprocessed or otherwise unaltered, it is referred to herein as a portion of raw machine data. In other implementations, the port of machine data in an event can be processed or otherwise altered. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various default fields.

2.4.3 Indexing

At blocks 314 and 316, an indexer can optionally generate a keyword index to facilitate fast keyword searching for events. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

At block 318, the indexer stores the events with an associated timestamp in a data store. Timestamps enable a user to search for events based on a time range. In some implementations, the stored events are organized into "buckets," where each bucket stores events associated with a specific time range based on the timestamps associated with each event. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some implementations, each bucket may be associated with an identifier, a time range, and a size constraint.

Each indexer may be responsible for storing and searching a subset of the events contained in a corresponding data store. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize the data retrieval process by searching buckets corresponding to time ranges that are relevant to a query.

In some implementations, each indexer has a home directory and a cold directory. The home directory of an indexer stores hot buckets and warm buckets, and the cold directory of an indexer stores cold buckets. A hot bucket is a bucket that is capable of receiving and storing events. A warm bucket is a bucket that can no longer receive events for storage but has not yet been moved to the cold directory. A cold bucket is a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some implementations, an indexer may also have a quarantine bucket that contains events having potentially inaccurate information, such as an incorrect time stamp associated with the event or a time stamp that appears to be an unreasonable time stamp for the corresponding event. The quarantine bucket may have events from any time range; as such, the quarantine bucket may always be searched at search time. Additionally, an indexer may store old, archived data in a frozen bucket that is not capable of being searched at search time. In some implementations, a frozen bucket may be stored in slower and/or larger memory, such as a hard disk, and may be stored in offline and/or remote storage.

Moreover, events and buckets can also be replicated across different indexers and data stores to facilitate high availability and disaster recovery as described in U.S. Pat. No. 9,130,971, entitled "Site-Based Search Affinity", issued on Sep. 8, 2015, and in U.S. patent Ser. No. 14/266,817, entitled "Multi-Site Clustering", issued on Sep. 1, 2015, each of which is hereby incorporated by reference in its entirety for all purposes. Further, additional detail generally regarding data ingestion is described in U.S. Pat. No. 10,268,755, entitled "Systems and Methods for Providing Dynamic Indexer Discovery", issued on Apr. 23, 2019, the entire contents of which is hereby incorporated by reference in its entirety for all purposes.

2.5 Query Processing

Figure 4:
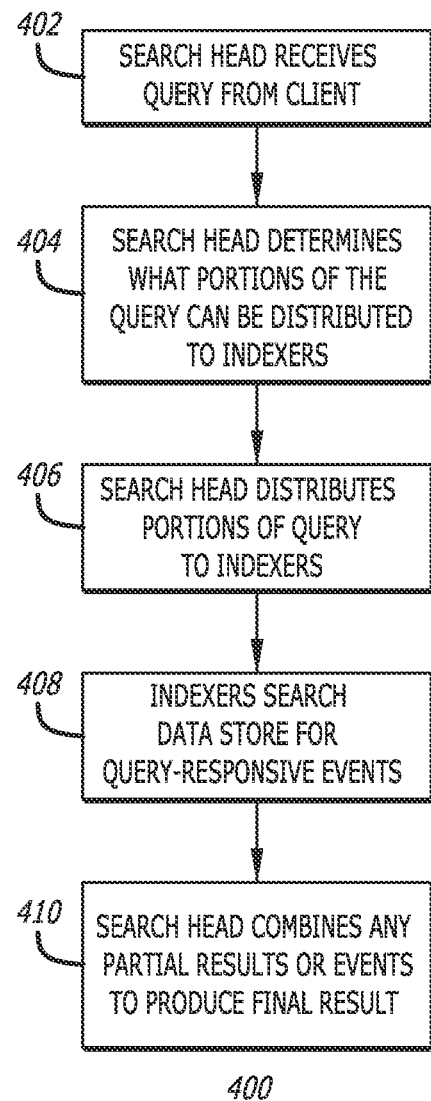
FIG. 4 is a flow diagram of an example method that illustrates how a search head and indexers perform a search query, in accordance with example implementations.

Referring now to FIG. 4, a flow diagram of an example method that illustrates how a search head and indexers of a data intake and query system instance perform a search query is shown in accordance with example implementations. Each block illustrated in FIG. 4 represents an operation performed in the method 400. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In some implementations, a search head cluster may take the place of an independent search head where each search head in the search head cluster coordinates with peer search heads in the search head cluster to schedule jobs, replicate search results, update configurations, fulfill search requests, etc. In some implementations, the search head (or each search head) communicates with a master node (also known as a cluster master, not shown in FIG. 2) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In some implementations, one or more rules for extracting field values may be specified as part of a source type definition in a configuration file. The indexers may then either send the relevant events back to the search head, or use the events to determine a partial result, and send the partial result back to the search head.

At block 410, the search head combines the partial results and/or events received from the indexers to produce a final result for the query. In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the data intake and query system instance, e.g., the instance $104_1$ of FIG. 1, may be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries, which may be particularly helpful for queries that are performed on a periodic basis.

2.6 Pipelined Search Language

Various implementations of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can operate to search or filter for specific data in particular set of data. The results of the first command can then be passed to another command listed later in the command sequence for further processing.

In various implementations, a query can be formulated as a command sequence defined in a command line of a search UI. In some implementations, a query can be formulated as a sequence of SPL commands. Some or all of the SPL commands in the sequence of SPL commands can be separated from one another by a pipe symbol "|". In such implementations, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various implementations described herein can be implemented with Splunk Processing Language (SPL) used in conjunction with the SPLUNK® ENTERPRISE system.

While a query can be formulated in many ways, a query can start with a search command and one or more corresponding search terms at the beginning of the pipeline. Such search terms can include any combination of keywords, phrases, times, dates, Boolean expressions, fieldname-field value pairs, etc. that specify which results should be obtained from an index. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some implementations, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various implementations is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field value criteria. For example, a search command can filter out all events containing the word "warning" or filter out all events where a field value associated with a field "clientip" is "10.0.1.2."

The results obtained or generated in response to a command in a query can be considered a set of results data. The set of results data can be passed from one command to another in any data format. In one implementation, the set of result data can be in the form of a dynamically created table. Each command in a particular query can redefine the shape of the table. In some implementations, an event retrieved from an index in response to a query can be considered a row with a column for each field value. Columns contain basic information about the data and also may contain data that has been dynamically extracted at search time.

2.7 Security Features

Each data intake and query system instance provides various schemas, dashboards, and visualizations that simplify developers' tasks to create applications with additional capabilities. One such application is the an enterprise security application, such as SPLUNK® ENTERPRISE SECURITY, which performs monitoring and alerting operations and includes analytics to facilitate identifying both known and unknown security threats based on large volumes of data stored by the data intake and query system instance. The enterprise security (ES) application provides the security practitioner with visibility into security-relevant threats found in the enterprise infrastructure by capturing, monitoring, and reporting on data from enterprise security devices, systems, and applications. Through the use of the data intake and query system instance searching and reporting capabilities, the enterprise security application provides a top-down and bottom-up view of an organization's security posture.

The enterprise security application leverages the data intake and query system instance search-time normalization techniques, saved searches, and correlation searches to provide visibility into security-relevant threats and activity and generate notable events for tracking. The enterprise security application enables the security practitioner to investigate and explore the data to find new or unknown threats that do not follow signature-based patterns.

Conventional Security Information and Event Management (SIEM) systems lack the infrastructure to effectively store and analyze large volumes of security-related data. Traditional SIEM systems typically use fixed schemas to extract data from pre-defined security-related fields at data ingestion time and store the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the enterprise security application system stores large volumes of minimally-processed security-related data at ingestion time for later retrieval and analysis at search time when a live security threat is being investigated. To facilitate this data retrieval process, the enterprise security application provides pre-specified schemas for extracting relevant values from the different types of security-related events and enables a user to define such schemas.

The enterprise security application can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "Security Threat Detection Based On Indications In Big Data Of Access To Newly Registered Domains," issued on Sep. 2, 2014, U.S. Pat. No. 9,215,240, entitled "Investigative And Dynamic Detection Of Potential Security-Threat Indicators From Events In Big Data," issued on Dec. 15, 2015, U.S. Pat. No. 9,173,801, entitled "Graphic Display Of Security Threats Based On Indications Of Access To Newly Registered Domains," issued on Nov. 3, 2015, U.S. Pat. No. 9,248,068, entitled "Security Threat Detection Of Newly Registered Domains," issued on Feb. 2, 2016, U.S. Pat. No. 9,426,172, entitled "Security Threat Detection Using Domain Name Accesses," issued on Aug. 23, 2016, and U.S. Pat. No. 9,432,396, entitled "Security Threat Detection Using Domain Name Registrations," issued on Aug. 30, 2016, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the enterprise security application facilitates detecting "notable events" that are likely to indicate a security threat. A notable event represents one or more anomalous incidents, the occurrence of which can be identified based on one or more events (e.g., time stamped portions of raw machine data) fulfilling pre-specified and/or dynamically-determined (e.g., based on machine-learning) criteria defined for that notable event. Examples of notable events include the repeated occurrence of an abnormal spike in network usage over a period of time, a single occurrence of unauthorized access to system, a host communicating with a server on a known threat list, and the like. These notable events can be detected in a number of ways, such as: (1) a user can notice a correlation in events and can manually identify that a corresponding group of one or more events amounts to a notable event; or (2) a user can define a "correlation search" specifying criteria for a notable event, and every time one or more events satisfy the criteria, the application can indicate that the one or more events correspond to a notable event; and the like. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 5A:
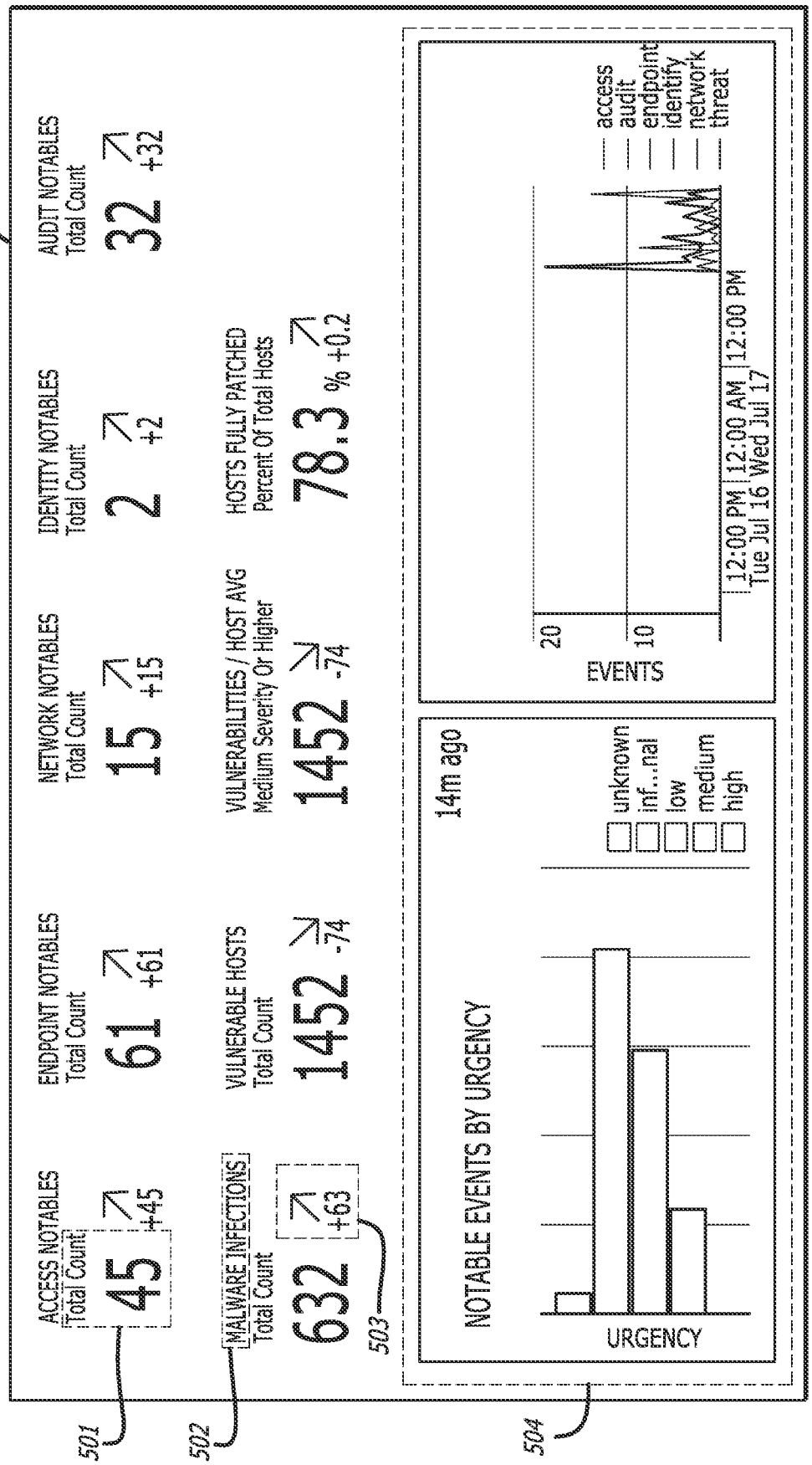
FIG. 5A is an interface diagram of an example user interface of a key indicators view, in accordance with example implementations.

The enterprise security application provides various visualizations (e.g., displays, graphical user interfaces, dashboards, etc.) to aid in discovering security threats, such as a "key indicators view" that enables a user to view security metrics, such as counts of different types of notable events. For example, FIG. 5A illustrates an example key indicators view 500 that comprises a dashboard, which can display a value 502, for various security-related metrics, such as malware infections 504. It can also display a change in a metric value 506, which indicates that the number of malware infections increased during the preceding interval. Key indicators view 500 additionally displays a histogram panel 508 that displays a histogram of notable events organized by urgency values, and a histogram of notable events organized by time intervals. This key indicators view is described in further detail in pending U.S. patent application Ser. No. 13/956,338, entitled "Key Indicators View," filed on 31 Jul. 2013, and which is hereby incorporated by reference in its entirety for all purposes.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 5B illustrates an example incident review dashboard 510 that includes a set of incident attribute fields 512 that, for example, enables a user to specify a time range field 514 for the displayed events. It also includes a timeline 516 that graphically illustrates the number of incidents that occurred in time intervals over the selected time range. It additionally displays an events list 518 that enables a user to view a list of all of the notable events that match the criteria in the incident attributes fields 512. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.8 Cloud-Based Architecture

As shown in the previous figures, various implementations may refer to a data intake and query system instance $104_1$ that includes one or more of a search head 220, indexers $216_1$-$216_2$, and a forwarder 214. In other implementations, data intake and query system instance $104_1$ may have a different architecture, but may carry out indexing and searching in a way that is indistinguishable or functionally equivalent from the perspective of the end user. For example, data intake and query system instance $104_1$ may be re-architected to run in a stateless, containerized environment. In some of these implementations, data intake and query system instance $104_1$ may be run in a computing cloud provided by a third party, or provided by the operator of the data intake and query system instance $104_1$. This type of cloud-based data intake and query system may have several benefits, including, but not limited to, lossless data ingestion, more robust disaster recovery, and faster or more efficient processing, searching, and indexing. A cloud-based data intake and query system as described in this section may provide separately scalable storage resources and compute resources, or separately scalable search and index resources. Additionally, the cloud-based data intake and query system may allow for applications to be developed on top of the data intake and query system, to extend or enhance functionality, through a gateway layer or one or more Application Programming Interfaces (APIs), which may provide customizable access control or targeted exposure to the workings of data intake and query system instance $104_1$.

In some implementations, a cloud-based data intake and query system (e.g., the data intake and query system $104_1$ configured for use with cloud-computing services) may include an intake system. Such an intake system can include, but is not limited to an intake buffer, such as Apache KAFKA® or Amazon KINESIS®, or an extensible compute layer, such as Apache SPARK™ or Apache FLINK®. In some implementations, the search function and the index function may be separated or containerized, so that search functions and index functions may run or scale independently. In some implementations, data that is indexed may be stored in buckets, which may be stored in a persistent storage once certain bucket requirements have been met, and retrieved as needed for searching. In some implementations, the search functions and index functions run in stateless containers, which may be coordinated by an orchestration platform. These containerized search and index functions may retrieve data needed to carry out searching and indexing from the buckets or various other services that may also run in containers, or within other components of the orchestration platform. In this manner, loss of a single container, or even multiple containers, does not result in data loss, because the data can be quickly recovered from the various services or components or the buckets in which the data is persisted.

In some implementations, the cloud-based data intake and query system may implement tenant-based and user-based access control. In some implementations, the cloud-based data intake and query system may implement an abstraction layer, through a gateway portal, an API, or some combination thereof, to control or limit access to the functionality of the cloud-based data intake and query system.

2.9 Centralized Multi-Instance Deployment Control System

Currently, clients often run multiple instances of Splunk Enterprise deployments and struggle to consolidate the information obtained by each instance. For example, a single corporation may deploy seven to ten, or more, instances of a data intake and query system (e.g., in one implementation, a Splunk Enterprise instance). A network administrator is currently forced to manage execution of search queries on each instance individually, without any solution for automating search queries performed on multiple instance or consolidating results obtained from those search queries into a simple, organized graphical user interface. In particular, specific challenges have prevented such solutions from being developed including varying login credentials for each data intake and query system instance, and the need to filter displayed information based on various administrators' individual privileges.

2.9.1 Introduction

The centralized multi-instance deployment control system disclosed herein provides for a system that enables a computer-automated process for communicating with a plurality of data intake and query system instances, handling the various login credentials for the plurality of instances, automating search queries on one or more of the instances, storing a copy of the search results, and generating graphical user interfaces that consolidate the obtained search results. Further, the system provides for role-based access control (RBAC) visibility to particular search results or interfaces.

In one implementation, the centralized multi-instance deployment control system includes a control logic that, upon execution by one or more processors, is configured to (i) handle the login process for each data intake and query system instance, (ii) automate the search query process among the plurality of data intake and query system instances, (iii) consolidate the obtained search results into one or more graphical user interfaces, and (iv) provide RBAC visibility based on various administrators' individual privileges.

Additionally, the centralized multi-instance deployment control system includes a set of application programming interfaces (APIs), such as a REST API or an API based on the REST architecture, which utilizes HyperText Transfer Protocol (HTTP) requests for communicating data. Similar APIs may also be included such as the Simple Object Access Protocol (SOAP) API. The APIs are utilized by the centralized multi-instance deployment control system to communicate with each data intake and query system instance, and optionally, with each client device.

Further, the centralized multi-instance deployment control system includes one or more polling scripts, wherein the scripts are configured to control performance of the search queries with each data intake and query system instance. For example, execution of a polling script may result in the processing of operations resulting in performance of a search query at a particular data intake and query system instance at predetermined intervals. Additionally, the centralized multi-instance deployment control system may then subsequently poll the instance for the search query results, wherein the search query may be performed every few hundred seconds with a polling operation occurring subsequent to the search query. However, the disclosure should not be limited in the time frame for the polling interval as each interval may be set for any time period.

Upon receipt of the search results of one or more search queries, the centralized multi-instance deployment control system stores the search results in a data store that may be local to the centralized multi-instance deployment control system (e.g., operating as part of the same server device), or may be located remotely. For example, the search results can be stored as either (i) an index, or (ii) a lookup. When the search results have been processed by a data intake and query system instance, such that metadata has been added and events have been created therefrom, the results are stored in an index, e.g., in a predetermined format including specific labeling and metadata fields. Alternatively, when the search query returns raw data, the results are stored in a lookup in the format received.

When the results of the search query have undergone field extraction operations prior to performance of the search query, the multi-instance deployment control system utilizes an HTTP event collector (HEC) in order to maintain field extraction during transmission from the data intake and query system instance to the multi-instance deployment control system. More specifically, when data is received at a data intake and query system instance from a data source, the data intake and query system instance may perform field extraction operations on the received data as discussed above. Following the field extraction operations, the data may include certain fields (e.g., extracted fields, indexed fields, metadata, etc.), which results or aids in the storage of the data as events. Further, when a search query is performed at a data intake and query system instance, the search results may include data that has undergone field extraction. Traditional transmission of such search query results would eliminate such fields and metadata. Therefore, in order to preserve the fields resulting from the field extraction operations, the search query results obtained at a data intake and query instance may be transmitted to the multi-instance deployment control system via the HEC. The HEC may comprise logic or a set of APIs that enable the preservation of the fields and metadata while transmitting the data included in the search query results from a data intake and query system instance to the multi-instance deployment control system.

In some implementations, the centralized multi-instance deployment control system includes a plurality of search query templates that may be performed at a plurality of data intake and query instances. In some implementations, the templates are directed to specific use cases, such as detection of security threats discussed above with respect to the as SPLUNK® ENTERPRISE SECURITY application. Further, the centralized multi-instance deployment control system may be specifically configured to generate graphical user interfaces that consolidate the search query results from a plurality of data intake and query instances in a single user interface and/or display chart.

2.9.2 Logical Representation and Exemplary Flow Diagrams

Figure 6:
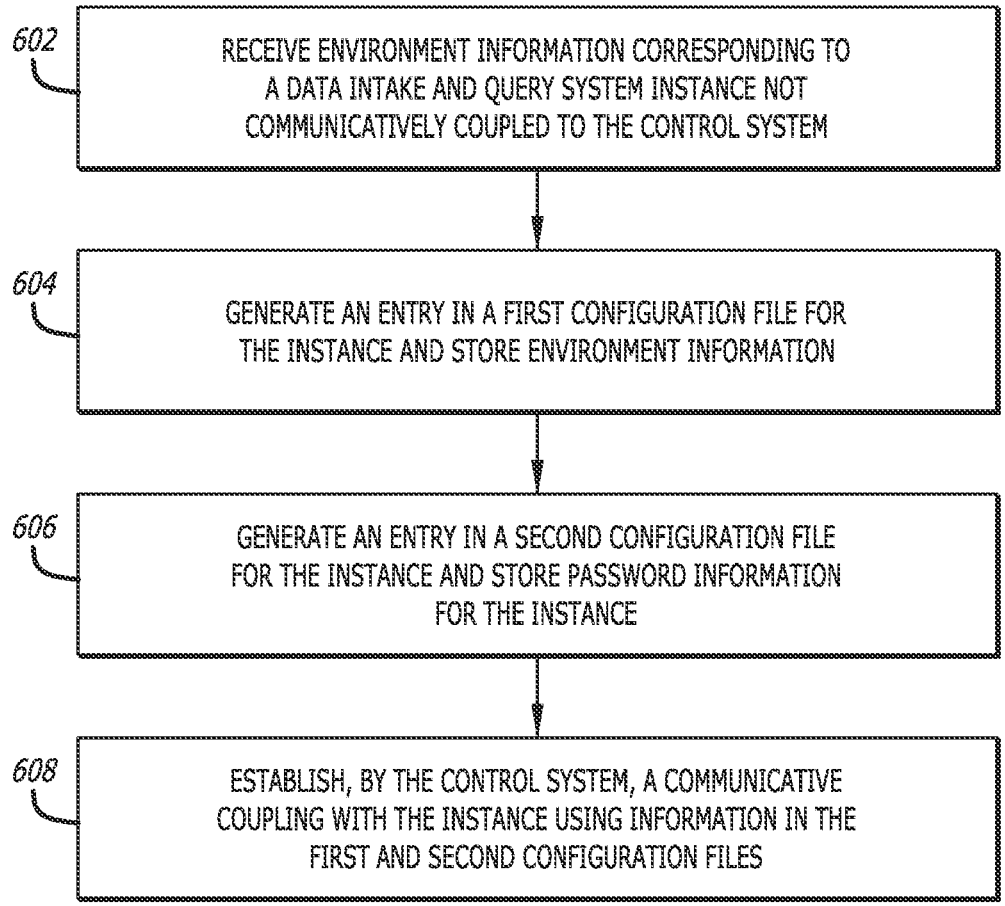
FIG. 6 is a flow diagram of an example method that illustrates a process for establishing a coupling with a data intake and query system instance by the centralized multi-instance deployment control system of FIG. 1, in accordance with example implementations.

Referring now to FIG. 6, a flow diagram of an example method that illustrates a process for establishing a coupling with a data intake and query system instance by the centralized multi-instance deployment control system of FIG. 1 is shown in accordance with example implementations. Each block illustrated in FIG. 6 represents an operation performed in the method 600 for establishing a coupling between a centralized multi-instance deployment control system and a data intake and query system instance. The method 600 begins when a centralized multi-instance deployment control system, e.g., the control system 102 of FIG. 1, receives environment information corresponding to a data intake and query system instance not currently communicatively coupled to the control system 102 (block 602). As used herein, the terms "environment" and "instance" (i.e., data intake and query system instance) will be used interchangeably. For example, the term "environment name" refers to the name of a data intake and query system instance. Examples of environment information may include an environment name, a management server corresponding to the instance, a web server corresponding to the instance (e.g., a uniform resource identifier (URI) providing access to the instance), and authentication credentials corresponding to the instance (e.g., username and password).

In response to receiving the environment information corresponding to an instance, the control system 102 generates an entry within a first configuration file corresponding to the instance and stores the environment information therein (block 604). The first configuration file may store entries, wherein each entry includes environment information for a particular instance. In some implementations, the first configuration file may be referred to as "environments.conf". As will be discussed below, the environments.conf file may be accessed by logic of the control system 102 in order to establish a communicatively coupling with a particular for the purpose of controlling and automating performance of one or more search queries at the instance. Various configuration files will be discussed herein, and each may be stored using various encryptions in order obfuscate the data stored thereon. As opposed to the use of a single configuration file that stores multiple entries, each instance may correspond to a separate environments.conf file.

Additionally, in response to receiving the environment information corresponding to an instance, the control system 102 generates an entry within a second configuration file corresponding to the instance and stores the authenticating credential information therein (block 606). The second configuration file may store entries, wherein each entry includes authentication credentials, such as a password, for authenticating with a particular instance. In some implementations, the second configuration file may be referred to as "passwords.conf". As will be discussed below, the passwords.conf file may be accessed by logic of the control system 102 in order to complete an authentication step that occurs during the communicatively coupling process. Additionally, each entry of the environments.conf file includes a reference to a corresponding entry in the passwords.conf file.

Subsequent to generating entries in the first and second configuration files and storing the relevant information therein corresponding to the instance, the control system 102 automatically establishes a communicative coupling with the instance using information stored in the first and second/or configuration files (block 608). The communicative coupling may be established as a result of user input received indicating a search query is to be performed at the instance, or based on a polling interval. Therefore, in order to control and automate the performance of the search query, the control system 102 first establishes a communicative coupling with the instance, and then initiates performance of the search query. Referring to some queries, the polling interval is every few seconds or hundreds of seconds and the query will be performed at that interval for a given time frame (e.g., every 100 seconds over a 24 hour timeframe) and in such cases, the communication session resulting from the communicative coupling remains active for the duration of the timeframe. However, in other implementations, the polling interval may be longer, e.g., once every 24 hours, and in such cases, the communication session may be terminated in between the performance of each search query.

Figure 7:
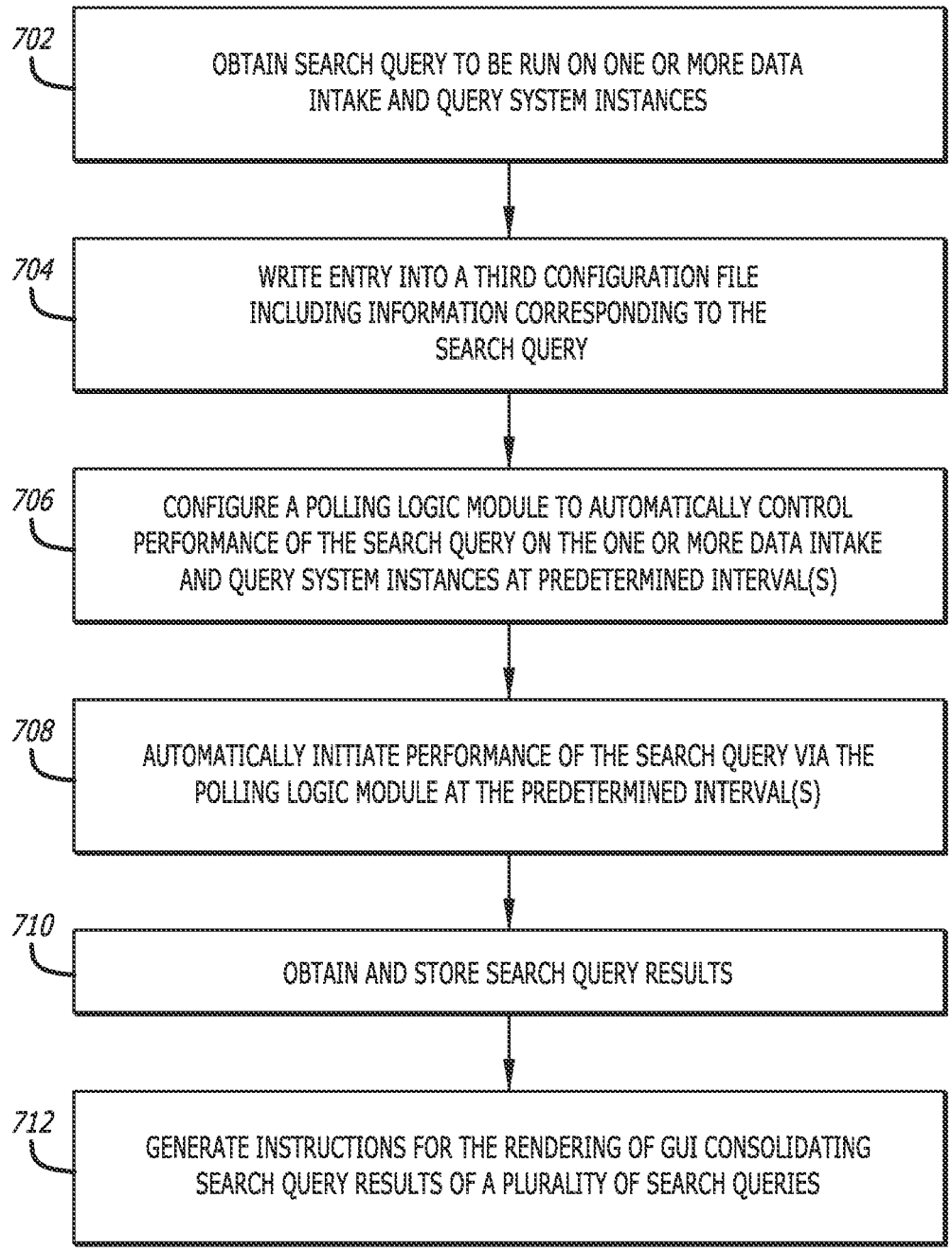
FIG. 7 is a flow diagram of an example method that illustrates a process for automating the performance of a search query by the centralized multi-instance deployment control system of FIG. 1, in accordance with example implementations.
Figure 8:
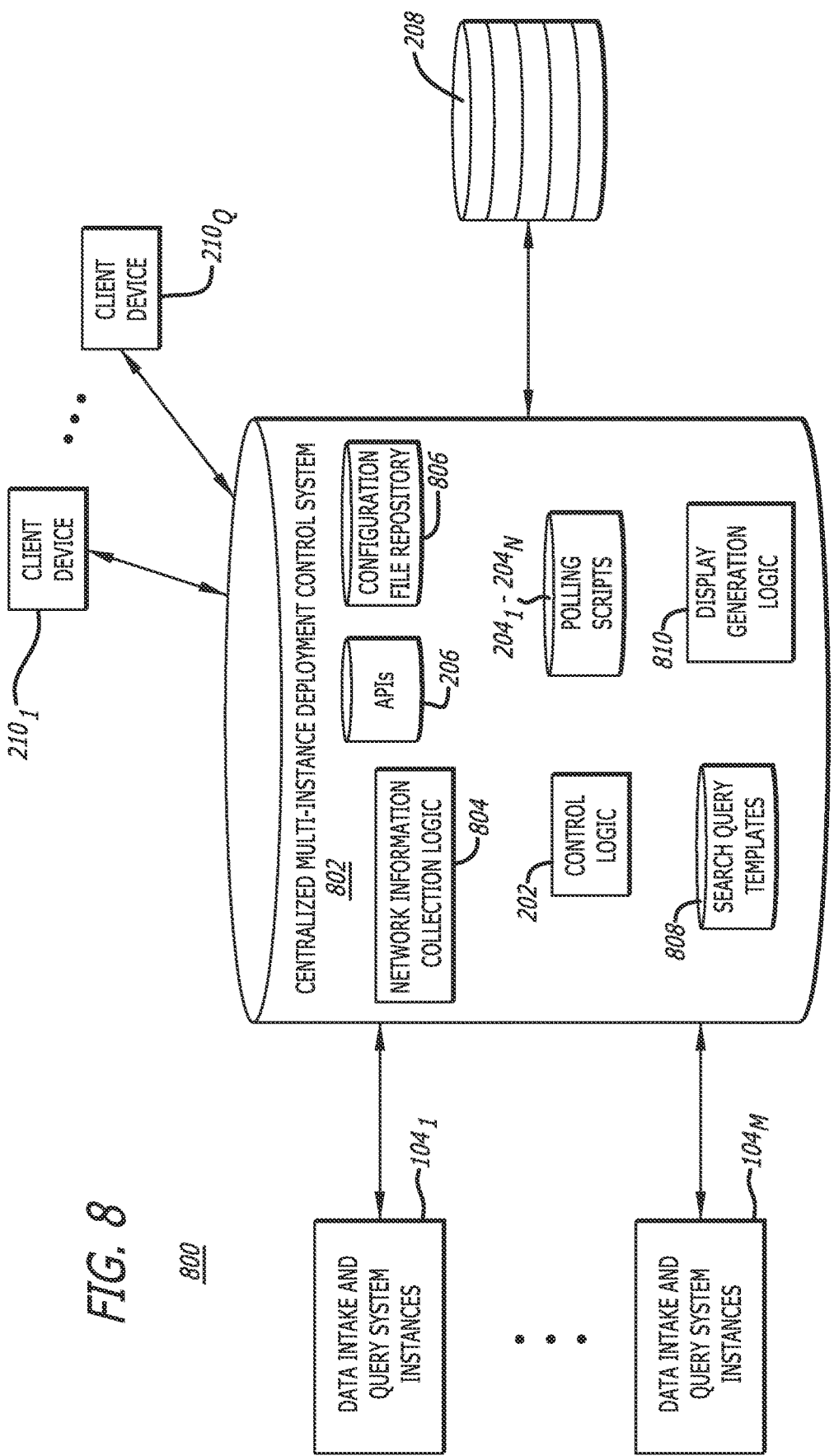
FIG. 8 is a detailed block diagram of a second example centralized multi-instance deployment control system, in accordance with example implementations.
Figure 9C:
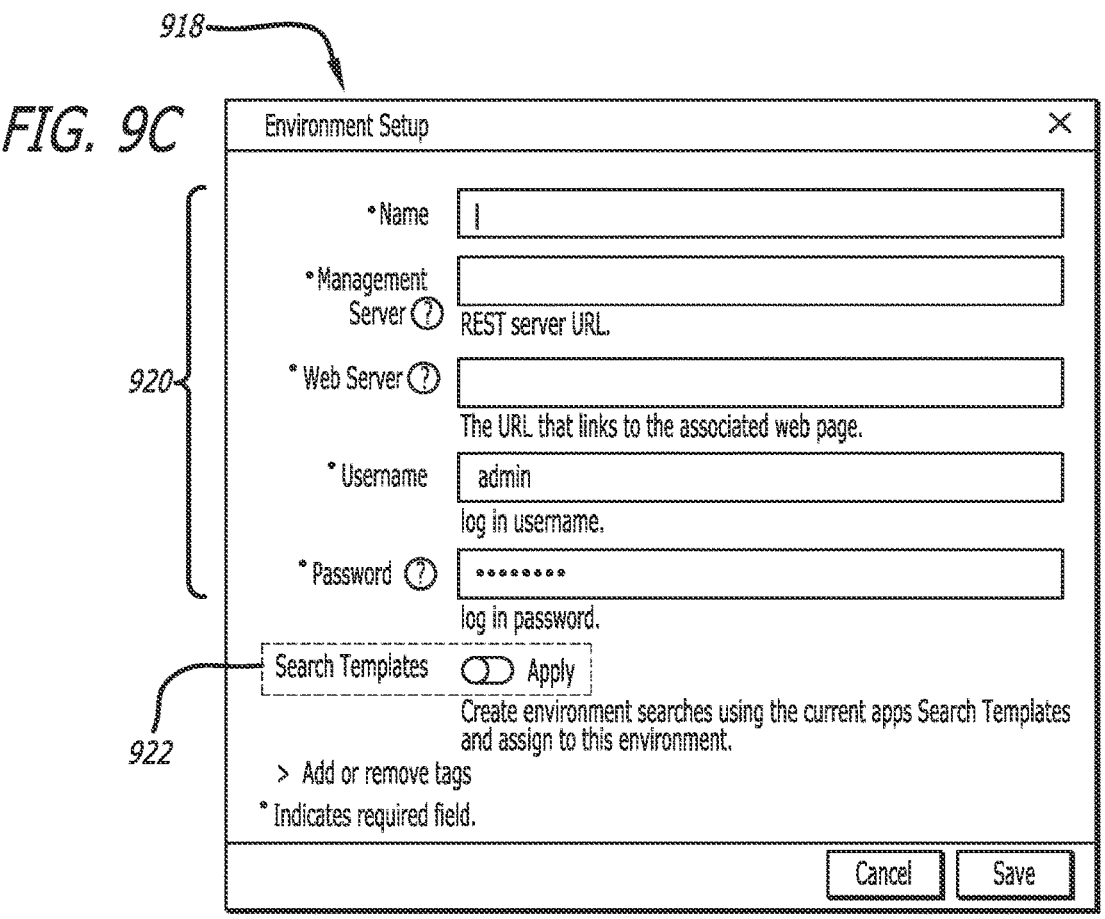
FIG. 9C is an interface diagram of an example user interface displaying information corresponding to environment configuration, in accordance with example implementations.
Figure 9D:
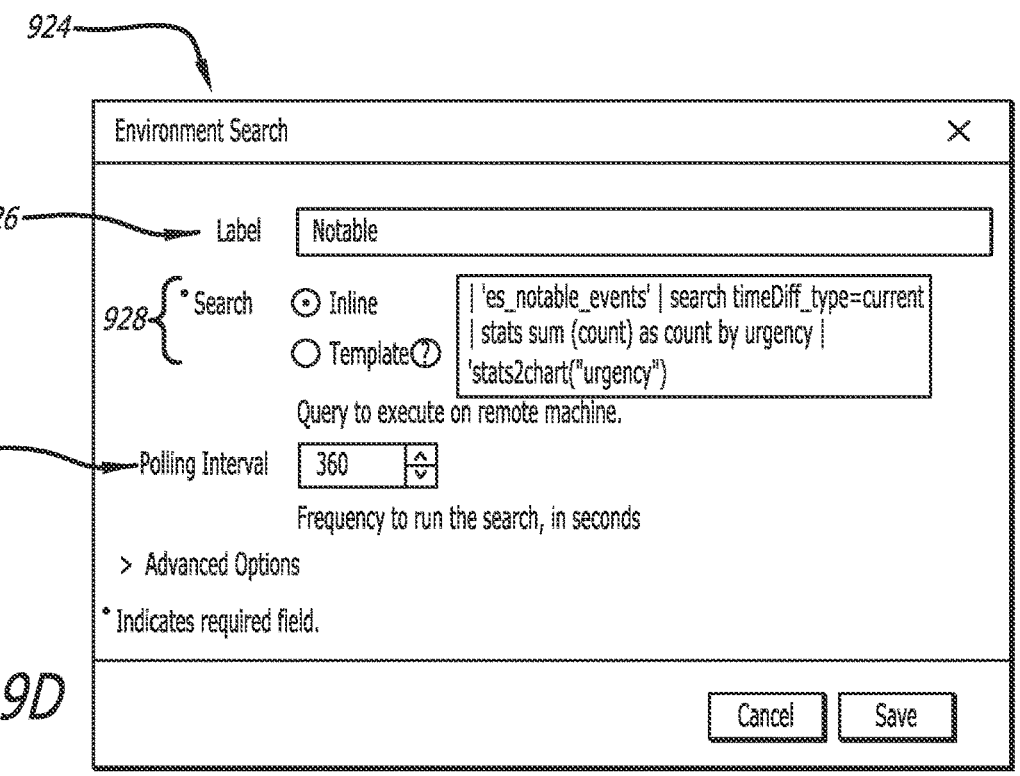
FIG. 9D is an interface diagram of an example user interface displaying information corresponding to environment search configuration, in accordance with example implementations.
Figure 13:
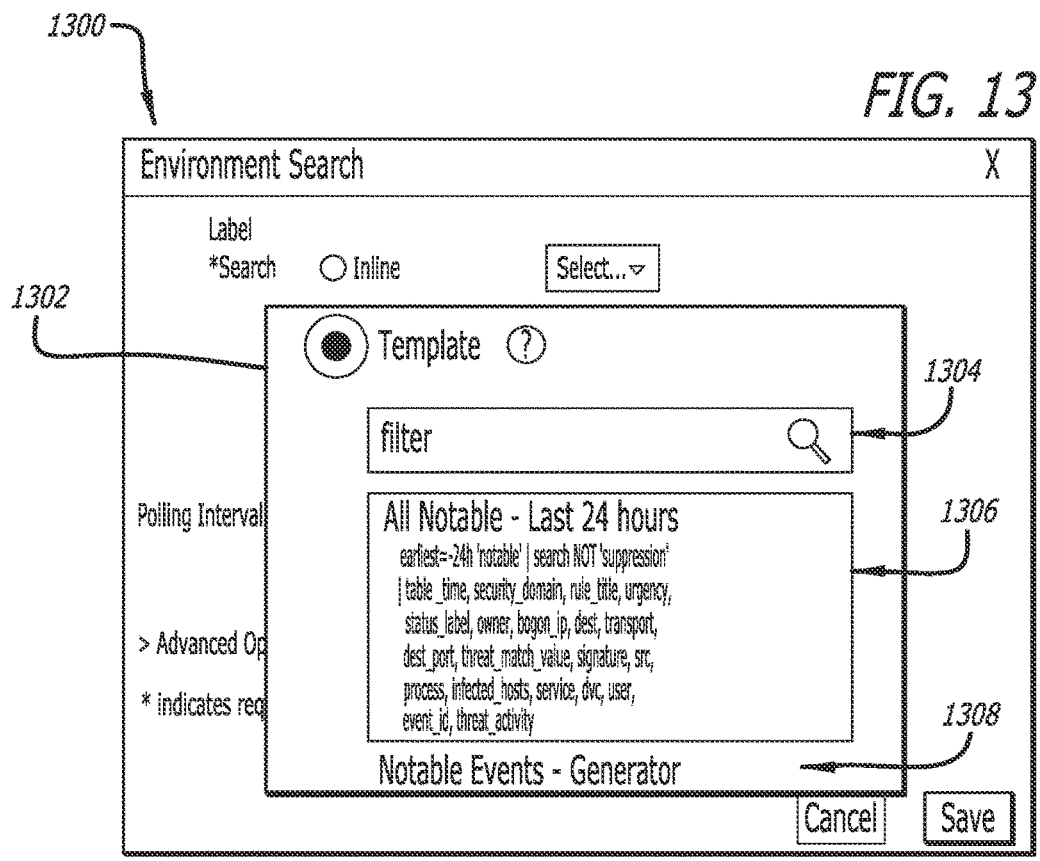
FIG. 13 is an interface diagram of an example user interface displaying information corresponding to an environment search configuration using a predetermined template search query, in accordance with example implementations.

Referring now to FIG. 7, a flow diagram of an example method that illustrates a process for automating the performance of a search query by the centralized multi-instance deployment control system of FIG. 1 is shown in accordance with example implementations. Each block illustrated in FIG. 7 represents an operation performed in the method 700 for initiating and automating performance of a search query on a data intake and query system instance that is communicatively coupled to the centralized multi-instance deployment control system of FIG. 1, e.g., the control system 102. The method 700 begins when a search query is obtained by the control system 102 that is to be run on one or more data intake and query system instances (block 702). For example, FIGS. 9D and 13 provide exemplary illustrations of user interfaces including user input fields configured to receive user input corresponding to a search query. Additionally, the control system 802 of FIG. 8 includes the configuration file repository 806, which may include the environments.conf file discussed above, which stores search queries for each instance.

The control system 102 writes information corresponding to the search query into an entry into a third configuration file (e.g., different then each of the first and second configuration files discussed above with respect to FIG. 6) (block 704). The third configuration file may be either a single configuration file specifically for an individual search query to be run on an individual instance, or may include entries, wherein each entry includes one or more search queries for a particular instance, the polling interval for each search query and a reference to an entry in the environments.conf file. In some implementations, the third configuration file may be referred to as "environment_searches.conf". In one implementation, the search query is stored within a repository local to the control system 102 (not shown in FIG. 1). For example, the environment_searches.conf file may be stored in the configuration file repository 806 of FIG. 8.

The control system 102 then configures one or more polling logic modules to automatically control performance of the search query on the one or more data intake and query system instances (block 706). One example of a polling logic module may be a script, and for purposes of ease, the disclosure will refer to a polling logic module as a polling script, but the disclosure is not intended to be limited to scripts. Configuring of polling script may include providing a polling script with a reference to the environment_searches.conf file and a polling interval if not included in the environment_searches.conf file. The polling script is then able to run at the polling interval by accessing the environments.conf file (or entry) corresponding to the instance at which the search query is to run, accessing the passwords.conf file (or entry) corresponding to the instance in order to authenticate with the instance, initiating performance of the search query, polling the instance for the results at a subsequent time, and storing the results as either an index or a lookup. As used herein, the phrase to "automatically control" may refer to the execution of instructions by one or more processors and may optionally include interaction with other hardware components without user intervention.

In some cases, the same search query is to be performed at a plurality of data intake and query instances. Thus, the control system 102 may configure a single polling script to automatically control performance of the search query on a plurality of instances. For example, executing of such a polling script results in retrieval of a single search query along with information corresponding to a plurality of instances (e.g., possibly varying polling intervals for one or more of the instances). In this manner, the control system 102 improves the performance of the search queries by utilizing fewer computing resources through configuring a single polling script to control performance of a search query on a plurality of instances in comparison to configuring a plurality of polling scripts to perform the same operations.

In some implementations, a common search query is to be performed on a plurality of instances. In such implementations, a single polling script may be configured to control the performance of the search query on each of the plurality of instances. However, in other implementations, a separate polling script may be configured to control the performance of the search query on each of the plurality of instances.

Following the configuration of the one or more polling scripts, the control system 102 automatically initiates performance of the search query via the one or more polling scripts at the predetermined interval(s) (block 708). As configured above, a polling script, such as the polling script 204$_1$, includes instructions that execute at a set polling interval, wherein the execution includes retrieving the search query from the environment_searches.conf file and establishing a communicative coupling with each of the one or more instances.

At a time subsequent to initiating the performance of the search query on a first instance, the control system 102 polls the first instance for the search query results (block 710). Upon obtaining the search query results, the results are stored in a repository or data store. In some implementations, the repository or data store is stored locally to the control system 102 (not shown in the figures). However, in other implementations, the repository or data store is remote from the control system 102, such as the repository or data store 208 of FIGS. 2 and 8. When the search query is to be performed at a plurality of instances, the control system 102 polls each instance accordingly.

In response to obtaining the search query results from at least the first instance, the control system 102 may generate instructions for rendering a graphical user interface consolidating the search query results from the first instance with additional search results, such as previous search query results from the first instance or search query results from one or more other instances (block 712). The consolidation may include results pertaining to the same search query and/or different search queries. The instructions are then provided to one or more client devices, such as the client devices 210$_1$-210$_Q$ as seen in FIG. 8. Execution of the instructions by one or more of the client devices 210$_1$-210$_Q$ may cause rendering of display screens such as those illustrated in FIGS. 9A-9B and 10-12.

Referring now to FIG. 8, a detailed block diagram of a second example centralized multi-instance deployment control system is shown in accordance with example implementations. The illustration of FIG. 8 includes many of the components illustrated in and described with respect to FIG. 2. In addition, the centralized multi-instance deployment control system (or "system") 802 includes a network information collection logic 804, a configuration file repository 806, a data store 808 for storage of search query templates and a display generation logic 810. FIG. 8 also illustrates that the system 802 may be communicatively coupled to a plurality of client devices 210$_1$-210$_Q$.

The configuration file repository 806 may represent a single repository or a plurality of repositories (e.g., a first repository storing the environments.conf file, a second repository storing the passwords.conf file, etc.). In either case, the contents of the repositories may be encrypted to obfuscate the contents stored therein.

As discussed above, the polling scripts 204$_1$-204$_N$ include at least a polling interval and a reference to an environment_searches.conf file (or entry). At the established polling interval, a polling script accesses the environments.conf file (or entry) corresponding to the instance at which the search query is to run, accesses the passwords.conf file (or entry) corresponding to the instance in order to authenticate with the instance, initiates performance of the search query, polls the instance for the results at a subsequent time, and stores the results as either an index or a lookup. An index refers to a repository for storing data on which field extraction operations have been performed as discussed above. An index stores received raw data that has been into events, which may include additional fields or metadata attached thereto such as a timestamp, a host, a source, and a source type. In one implementations, an index is a repository for storing Splunk Enterprise data. A lookup refers to the storage of raw data received from a data source that has not undergone the processing associated with field extraction operations.

The data store 808 is configured to store search query templates. As discussed throughout the disclosure, and specifically with respect to FIGS. 9C and 13, the control system 802 may receive search queries via user input such as through text input, and/or may retrieve search query templates. In either implementation, a polling script 204$_1$ retrieves a search query and, via a communicative coupling with an instance, such as the instance 104$_1$, controls and automates performance of the search query at the instance 104$_1$. When user input indicates that the control system 802 is to utilize search query templates, polling scripts 204$_1$-204$_N$ may facilitate selection of a search query template from the data store 808.

The display generation logic 810 is configured to generate instructions that, upon execution by a client device, cause the rendering of one or more interfaces, e.g., those illustrated in FIGS. 9A-13. The display generation logic 810 may generate the instructions based on the search queries that were performed and/or the client devices 210$_1$-210$_Q$ that are to receive the instructions. As a first example, an entry in the environments.conf file may include specific data regarding the display of search query results. In such an example, the display generation logic 810 may utilize the instructions stored within the entry in the environments.conf file when generating instructions that are to be provided to the corresponding client device. In a second example, the use of a specific search query template may correspond to the display of information in a particular manner. Therefore, in some cases, the display generation logic 810 may use predefined logic (e.g., macros) that generate instructions for rendering interfaces wherein search query results from a plurality of instances are consolidated into a single display chart.

2.9.3 Display Interfaces

The following discussion focuses on example graphical user interfaces that may be rendered on a client device to: (1) display the search query results; or (2) provide interfaces including user input fields configured to receive input corresponding to establishing a communicative coupling with a data intake and query system instance and/or the search query to be performed thereon. More particularly, FIGS. 9A-9B and 13 provide user input fields, while FIGS. 9C-9D and 10-12 illustrate exemplary interfaces for displaying search query results. As discussed above, in response to obtaining search query results, the control system 102 or 802 may generate instructions that, when executed by a client device, cause the rendering of one or more graphical user interfaces. Reference to the control system 802 will be utilized below for purposes of clarity. The interfaces of FIGS. 9C-9D and 10-12 provide various visualizations that aid in digesting information contained within the search query results. In particular, the control system 802 may control and automate performance of search queries on a plurality of data intake and query system instances. The interfaces may provide displays of consolidated search query results from a plurality of instances.

Referring now to FIG. 9A, an interface diagram of an example user interface displaying a consolidated search query results view is shown in accordance with example implementations. The interface 900 of FIG. 9A includes text located in the upper left corner of that indicates search query results from five instances (e.g., environments) are consolidated in the single interface. As shown, search query results from two instances ("ES Nightly 1" and "ES Nightly 2") are illustrated for purposes of clarity (listing 902). In particular, the interface 900 includes several details 904 corresponding to the instances including, but not limited or restricted to: name; management server (e.g., specifics to define the computing device on which the instance is processing); web server; errors; status; and actions. The display 900 illustrates additional information corresponding to a selected instance, e.g., ES Nightly 2, including username, tags, a number of search queries previously performed thereon within a given timeframe. Further, an icon below the tags information enables the viewer to manually provide instruction to have the search queries performed again. The listing 906 provides detailed information corresponding to the search queries performed on the instance including, but not limited or restricted to: label; errors; latest results; polling interval; last run; search time; status; and actions.

The illustration of FIG. 9A provides a view of the ability of the control system 802 to drill down into a specific instance and retrieve additional information. Specifically, in response to receiving user input selecting the entry in the listing 902 corresponding to "ES Nightly 2," the control system 802 communicates with the ES Nightly 2 instance through a set of network commands, typically HTTP commands, in order to retrieve the detailed information displayed, specifically, the information displayed in the listing 906. Receipt of user input corresponding to the selection of the ES Nightly 2 entry causes formation of a communication link between the control system 802 (providing data to the interface 900) and an external target (the ES Nightly 2 instance).

The communication link between control system 802 and the external target may be through a uniform resource locator (URL) received via user input prior to the establishment of a communication coupling, as discussed in with respect to FIG. 6. For example, the URL may be used as an authentication parameter (e.g., a "token" in the Splunk dashboard system). The presence of the URL enables the control system 802 to access specific data stored at a computing device on which the instance is processing through user input received by the user interface 900. For example, an administrator may provide click on a link displayed by the user interface 900, wherein the link includes or in otherwise associated with the URL of the corresponding computing device. By clicking on such a link, the control system 802 access data stored on or accessible by the computing device via the URL.

In one example, the URL may be retrieved via the utilization by the control system 802 of the REST APIs using a query command, such as the "| rest" SPL command, which enables the control system 802 to access (or "drilldown to") specific data of the computing machine on which the instance is processing.

Referring to FIG. 9B, an interface diagram of an example user interface displaying a consolidated search query results view subject to role-based access control (RBAC) visibility requirements is shown in accordance with example implementations. Each of the illustrated sections of data displayed by the user interface 908 including data sections 910, 912, 914 and 916 may be RBAC controllable resources. Thus, in order for an administrator or other user to view particular data, e.g., data included within the data section 910 for example, the user will be required to provide the required authentication credentials prior to accessing such data. In some implementations, the authentication credentials may be required by the control system 802 prior to initiating search queries corresponding to a RBAC controllable resource.

Referring to FIG. 9C, an interface diagram of an example user interface displaying information corresponding to environment configuration is shown in accordance with example implementations. The interface 918 provides a user with various user input fields, e.g., text fields, that are configured to receive user input corresponding to the communicative coupling of a data intake and query instance with the control system 802. Specifically, the interface 918 includes a user input field, e.g., the toggle 922, which provides an indication to the control system 802 as to whether search queries are to be generated using search templates, such as those stored in the repository 810 of FIG. 8. When activated, the control system 802 may generate instructions the execution of which provides a user with an interface displaying several search template options from which to select via user input. The information obtained by the control system 802 via the user input provided to the user input fields 920 may correspond to at least a portion of the environment information discussed above at least with respect to block 602 of FIG. 6.

Referring to FIG. 9D, an interface diagram of an example user interface displaying information corresponding to environment search configuration is shown in accordance with example implementations. The interface 924 provides a user with various user input fields that are configured to receive user input corresponding to a search query that is to be performed at one or more data intake and query instances. Specifically, the interface 924 includes a text field 926 configured to receive a label, e.g., name, for the search query. The label may be used to retrieve the results corresponding to the search query, e.g., by one or more macros that aid in the rendering of interfaces displaying a summary view of consolidated search results (e.g., FIGS. 9A, 9B, 10, 11 and 12).

Further, the interface 924 includes input fields 928 corresponding to whether the search query is to be provided via user input (e.g., "inline"), as illustrated, or via a template (as seen in FIG. 13). Input field 930 is configured to receive user input corresponding to a polling interval, which refers to the frequency at which the search query is to be performed.

Figure 10:
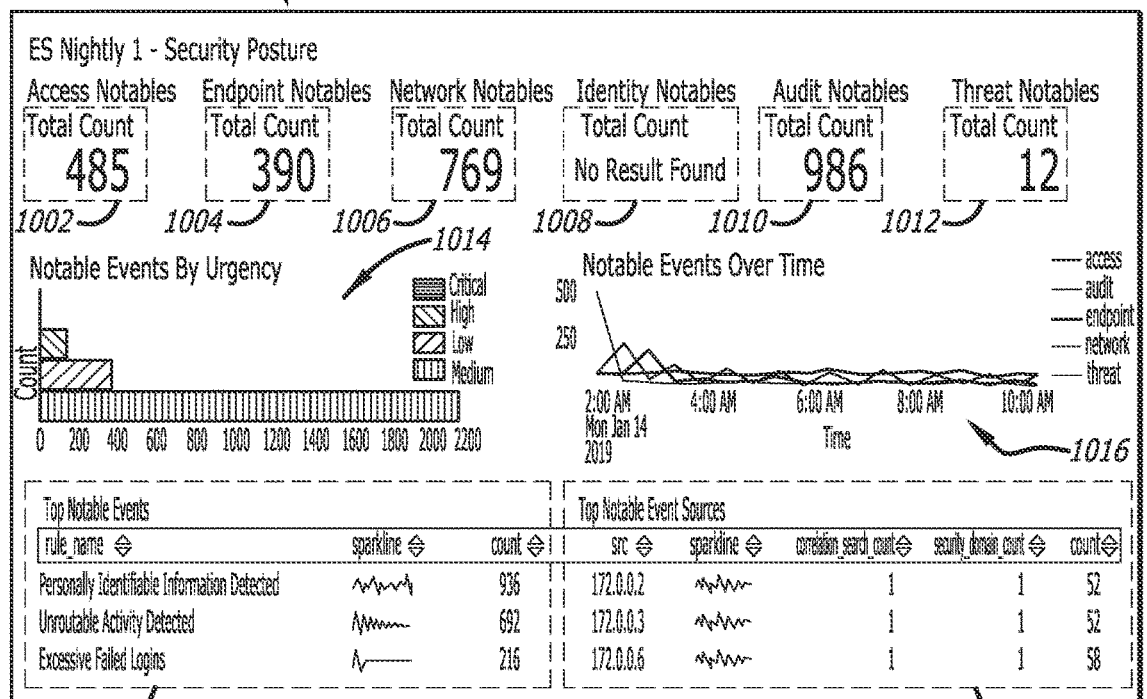
FIG. 10 is an interface diagram of an example user interface dashboard of search query results of a first environment, in accordance with example implementations.

Referring to FIG. 10, an interface diagram of an example user interface dashboard of search query results of a first environment is shown in accordance with example implementations. FIG. 10 illustrates a graphical user interface 1000, which here may be referred to as a "dashboard," as the interface 1000 provides a viewer, such as a network administrator, IT specialist or otherwise, a display of information corresponding to results of one or more search queries performed by a particular data intake and query system instance.

In this particular illustration, the interface 1000 assists the viewer in discovering security threats, such as through a "key indicators view," that enables a user to view security metrics, such as counts of different types of notable events. For example, the interface 1000 of FIG. 10 illustrates various notable metrics such as access notable metrics 1002, endpoint notable metrics 1004, network notable metrics 1006, identity notable metrics 1008, audit notable metrics 1010 and threat notable metrics 1012. The interface 1000 may additionally display a first graph panel 1014 that displays information, e.g., as a histogram, of notable events organized by urgency values, and a second graph panel 1016 of notable events organized by time intervals. Further, the interface 1000 may additionally display specifics of some notable events, such as in chart 1018, and/or specifics of some sources of notable events, such as in chart 1020.

As discussed above with respect to FIGS. 5A-5B, notable events can include: (1) a single event of high importance, such as any activity from a known web attacker; or (2) multiple events that collectively warrant review, such as a large number of authentication failures on a host followed by a successful authentication. Whether an event is labeled as notable may be based on a variety of characteristics. In some implementations, a threshold may be established for a particular metric (e.g., number of failed login attempts within a predetermined time frame), such that when the threshold is met for a particular event, the event is labeled as notable. Additionally, an event may be labeled as notable according to a rule-based system, e.g., when personally identifiable information is detected within a network transmission, the corresponding event may be labeled notable.

Although the interface 1000 provides a display of security threat information based on search query results from a particular instance, the interface 1000 is not limited to displaying security threat information but may display any information retrieved as part of search query results. For example, the notable events may corresponding to performance metrics measured by a plurality of network devices such as IoT sensors coupled to wind turbines.

Figure 11:
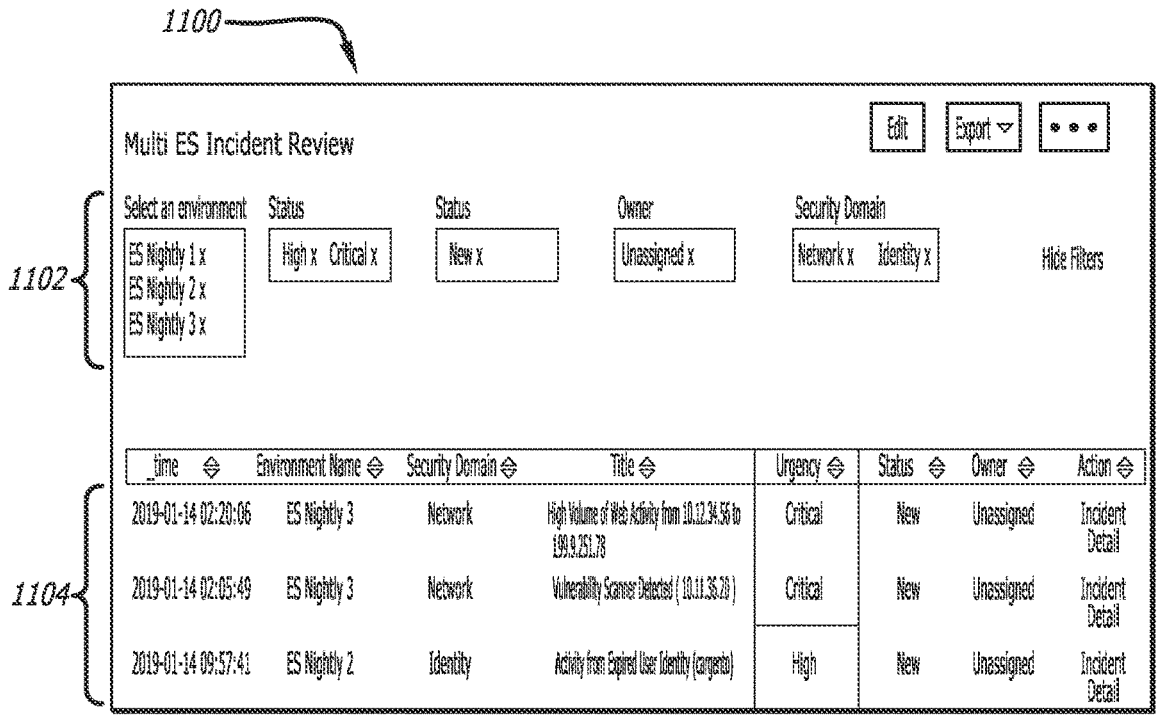
FIG. 11 is an interface diagram of an example user interface dashboard of search query results of a plurality of environments, in accordance with example implementations.

Referring to FIG. 11, an interface diagram of an example user interface dashboard of search query results of a plurality of environments is shown in accordance with example implementations. FIG. 11 illustrates a graphical user interface 1100, which similarly to the interface 1000 of FIG. 10 may be referred to as a "dashboard." In contrast to the interface 1000 that displays notable events corresponding to search query results from a single data intakes and query instance, the interface 1100 provides a viewer, such as a network administrator, IT specialist or otherwise, a display of information corresponding to results of one or more search queries performed by a plurality of data intake and query system instances in a consolidated, searchable manner. Further, the consolidated view of the interface 1100 is configured to be filtered to various degrees according to the viewer's desire.

For example, FIG. 11 illustrates an example mutli-ES incident review dashboard 1100 that includes a set of filters 1102 that, for example, enables a user to limit displayed events (also referred to as incidents). As illustrated, example filters 1102 includes: environments; event status; environment status; owner; security domain; etc.

Based on the selected filters, the dashboard 1100 provides a graphical illustration, in this example a chart 1104, displaying events and corresponding detailed information that are part of one or more search query results and satisfy the requirements of the selected filters. The chart 1104 may provide detailed information for each event satisfying the requirements of the selected filters including, but not limited or restricted to: time; corresponding environment name; security domain; title; urgency; status; owner; and action.

Importantly, the dashboard 1100 illustrates a summary view of events across multiple instances, which solves the technological problem of silo views discussed above. The ability of the control system 802 to automatically establish communicative couplings with a plurality of instances, automate and control the performance of a search query on each of the plurality of instances, and consolidate the results in a summary view provides several technological advantages including efficiently utilizing computing resources as compared to performing search queries in an individualized manner and rendering individual dashboards to display search query results. Specifically, dashboard 1100 illustrates that search query results from three instances may be displayed ("ES Nightly 1," "ES Nightly 2" and "ES Nightly 3"). As is illustrated in the chart 1104, detailed information of events from two environment—"ES Nightly 2" and "ES Nightly 3"—are shown.

Additionally, in order to facilitate identifying patterns among the events, each event can be associated with an urgency value (e.g., low, medium, high, critical), which is indicated in the incident review dashboard. The urgency value for a detected event can be determined based on the severity of the event and the priority of the system component associated with the event.

Figure 12:
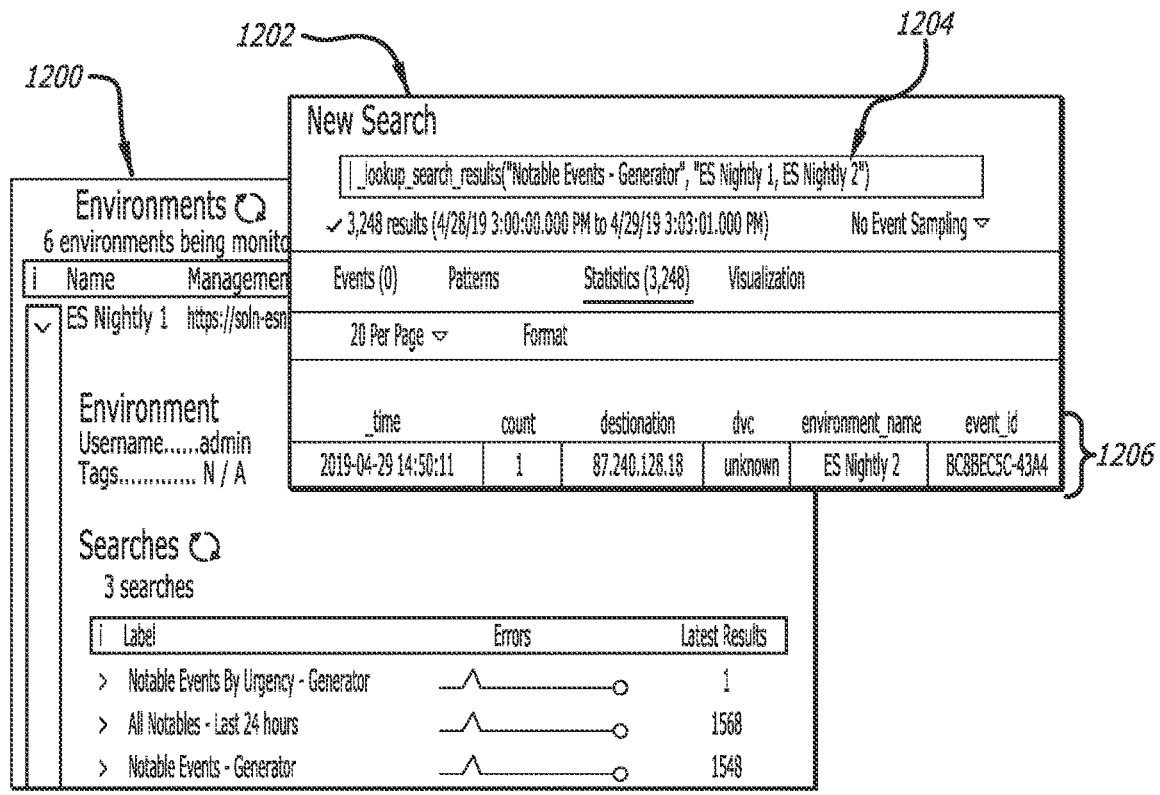
FIG. 12 illustrates a first interface diagram of an example user interface dashboard of search query results of a plurality of environments having a second interface diagram corresponding to search query results overlaid thereon, in accordance with example implementations.

Referring to FIG. 12, a first interface diagram of an example user interface dashboard of search query results of a plurality of environments having a second interface diagram corresponding to search query results overlaid thereon is shown in accordance with example implementations. The interface 1200 is similar that the interface 900 of FIG. 9A providing an example user interface displaying a consolidated search query results view. The interface 1202 that is displayed as partially overlaying the interface 1200 (e.g., as a "pop-up") provides various detailed information of the search query.

As referenced above, the display generation logic 810 may utilize predefined logic (e.g., one or more macros) for generating display instructions. The interface 1202 may be an illustrative example of an interface rendered from instructions at least partially generated as a result of execution of a macro. In particular, the text field 1204 illustrates a macro that is executed to retrieve query search results from a plurality of instances based on the instance name and the search query label. As shown, the data displayed by the interface 1202 corresponds to search query results of the search query labeled, "Notable Events-Generator," for the instances named, "ES Nightly 1," and "ES Nightly 2."

Importantly, the interface 1202 consolidates results of search queries performed on two data intake and query instances, namely, "ES Nightly 1," and "ES Nightly 2," into a single interface that is easily consumed by an administrator. Specifically, the interface 1202 provides text indicating (i) a number of values obtained (displayed as "results"), e.g., "3,248," and (ii) the time of performance of the search query, e.g., "4/28/19 3:00:00.000 PM to 4/29/19 3:00:01.000 PM"). Further, chart 1206 provides additional detail as to metrics of each of the values obtained including, but not limited or restricted to: time; count; destination; DVC; environment name; and event identifier. Although FIG. 12 illustrates only a single entry in the chart 1206, given additional space, additional entries would be shown.

Referring to FIG. 13, an interface diagram of an example user interface displaying information corresponding to an environment search configuration using a predetermined template search query is shown in accordance with example implementations. FIG. 13 illustrates a graphical user interface 1300 similar to the interface 924 of FIG. 9D. However, in contrast to the interface 924 that provides a user input field configured to receive a search query via user input, the interface 1300 includes a listing of template search queries (such as queries 1306 and 1308) as well as a user input field 1304 for receiving user input corresponding to text for searching the listing of template search queries.

Figure 14:
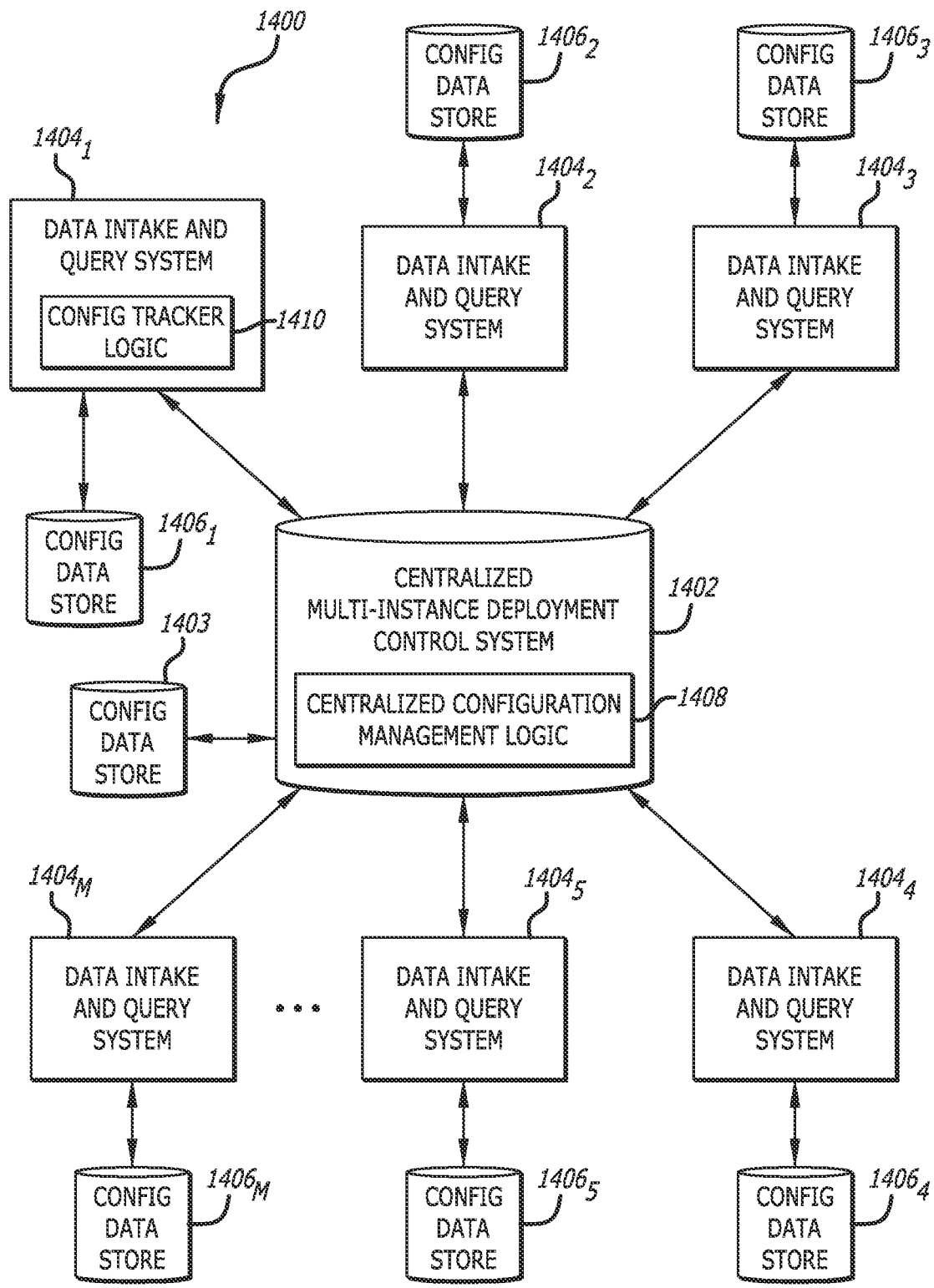
FIG. 14 is a block diagram of an example networked computer environment illustrating the centralized multi-instance deployment control system of FIG. 1 including a centralized configuration management logic, in accordance with example implementations.

Referring now to FIG. 14, a block diagram of an example networked computer environment illustrating the centralized multi-instance deployment control system of FIG. 1 including a centralized configuration management logic is shown in accordance with example implementations. As illustrated, the networked computer environment 1400 comprises many of the same components as the networked computer environment 100 of FIG. 1; however, many of the components have been renumbered from a 100 series to a 1400 series. Unless a distinction is noted herein, the components of FIG. 14 include the functionality of the components of FIG. 1 having corresponding numbers. In fact, FIG. 14 discusses additional functionality of the centralized multi-instance deployment control system 1402 and of a data intake and query system instance 1404 as compared to their counterparts in FIG. 1.

Referring to FIG. 14, the networked computer environment 1400 includes a centralized multi-instance deployment control system 1402 that is communicatively coupled to one or more data intake and query system instances (or "instance") $1404_1$-$1404_M$ (wherein M≥1). In one implementation, the centralized multi-instance deployment control system (or "control system") 1402 stores or has access to credential information for each data intake and query system instances $1404_1$-$1404_M$ in order to automatically establish a communicative coupling with each instance $1404_1$-$1404_M$. In some implementations and in addition to those discussed with respect to FIG. 1, the control system 1402 may receive information pertaining to changes to one or more configuration parameters of a particular instance $1404_1$-$1404_M$ that has processing thereon a configuration tracker logic 1410 ("config tracker logic"). As illustrated in FIG. 14, the instance $1404_1$ includes the config tracker logic 1410.

For example, following notification of a change to a configuration parameter of the instance $1404_1$, a centralized configuration management logic 1408 of the control system 1402 generates instructions to be transmitted to one or more of the instances $1404_2$-$1404_M$ ("remote instances") that, upon execution by one or more processors, cause updating of the corresponding configuration parameters of the one or more remote instances to be consistent with the changed configuration parameter of the instance $1404_1$. Many variations on this general example exist that will be discussed in more detail below.

In some implementations, the instances $1404_1$-$1404_M$ are each coupled to, have access to, or otherwise include a configuration data store $1406_1$-$1406_M$. Each configuration data store $1406_1$-$1406_M$ may store the configuration files setting forth the configuration parameters. Thus, the instructions transmitted by the centralized configuration management logic 1408 may, upon execution, result in replacement of the current one or more configuration files of one or more remote instances with one or more new configuration files provided by the centralized configuration management logic 1408. The centralized configuration management logic 1408 may transmit new configuration files directly or may provide access to new configuration files to be downloaded from a centralized data store 1403.

In various implementations, the centralized configuration management logic 1408 may determine a change has been made to a configuration parameter of the instance $1404_1$ through push or pull methods. In some examples, a notification of a change may be pushed by the config tracker logic 1410 to the centralized configuration management logic 1408 (push). However, in other examples, the centralized configuration management logic 1408 may query the config tracker logic 1410 for any changes (pull). Either push or pull method may occur automatically (e.g., at predetermined intervals) and/or at the time of a triggering event (e.g., detection of a change by the config tracker logic 1410 or user input requesting a pull to determine whether any changes have occurred).

In some implementations, changes to predetermined configuration parameters may be excluded from transmission to one or more instances $1404_2$-$1404_M$. For example, following a change to a specific configuration parameter (e.g., a first configuration parameter) of the instance $1404_1$, the config tracker logic 1410 may determine whether the configuration parameter appears on a predetermined listing of configuration parameters that, when changed, are not to be provided to the centralized configuration management logic 1408 by either a push or pull method (e.g., a "deny list"). Thus, the config tracker logic 1410 may provide an push notification to the centralized configuration management logic 1408 indicating a change to another configuration parameter (e.g., a second configuration parameter) but excluding an indication that a change to the specific configuration parameter (e.g., the first configuration parameter) occurred.

In other examples, the config tracker logic 1410 may provide an indication as to all configuration parameter changes to the centralized configuration management logic 1408 and the centralized configuration management logic 1408 may determine whether the configuration parameter appears on the deny list. Thus, upon receiving an indication from the config tracker logic 1410 that a configuration parameter appearing on the deny list has been changed on the instance $1404_1$, the centralized configuration management logic 1408 will exclude the change when generating instructions for one or more instances $1404_2$-$1404_M$ to update their configuration parameters. In situations when the only change to the configuration parameters of the instance $1404_1$ is to a configuration parameter appearing on the predetermined list, the centralized configuration management logic 1408 may refrain from generating such instructions.

As will be discussed in further detail below, the config tracker logic 1410 may be executed by one or more processors of a computing device on which the instance $1404_1$ is processing to monitor any activity occurring with the configuration files of the instance $1404_1$. As discussed above, the instance $1404_1$ may provide a graphical user interface (GUI) to a user, such as an administrator, that is configured to receive user input resulting in a change of a configuration parameter. Generally, configuration parameters (also referred to as configuration settings) may include, but are not limited or restricted to: system settings, authentication and authorization information, index-related settings, deployment and cluster configurations, and/or knowledge objects and saved searches.

Figure 15:
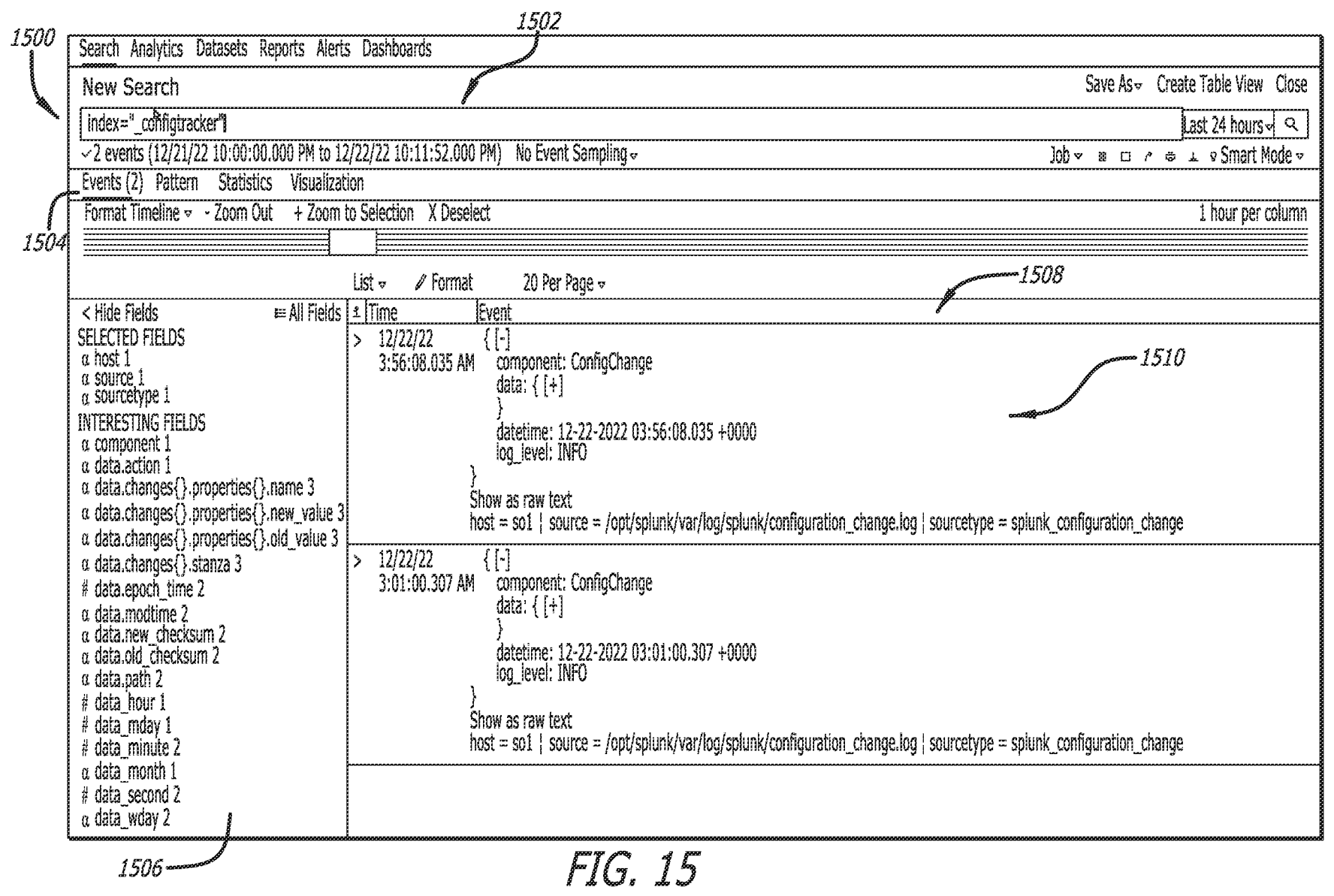

Additionally, the instance $1404_1$, through functionality of the config tracker logic 1410, may provide a GUI to a user that enables viewing and investigating of configuration parameter changes. An example of such a GUI is illustrated in FIG. 15.

Figure 17:
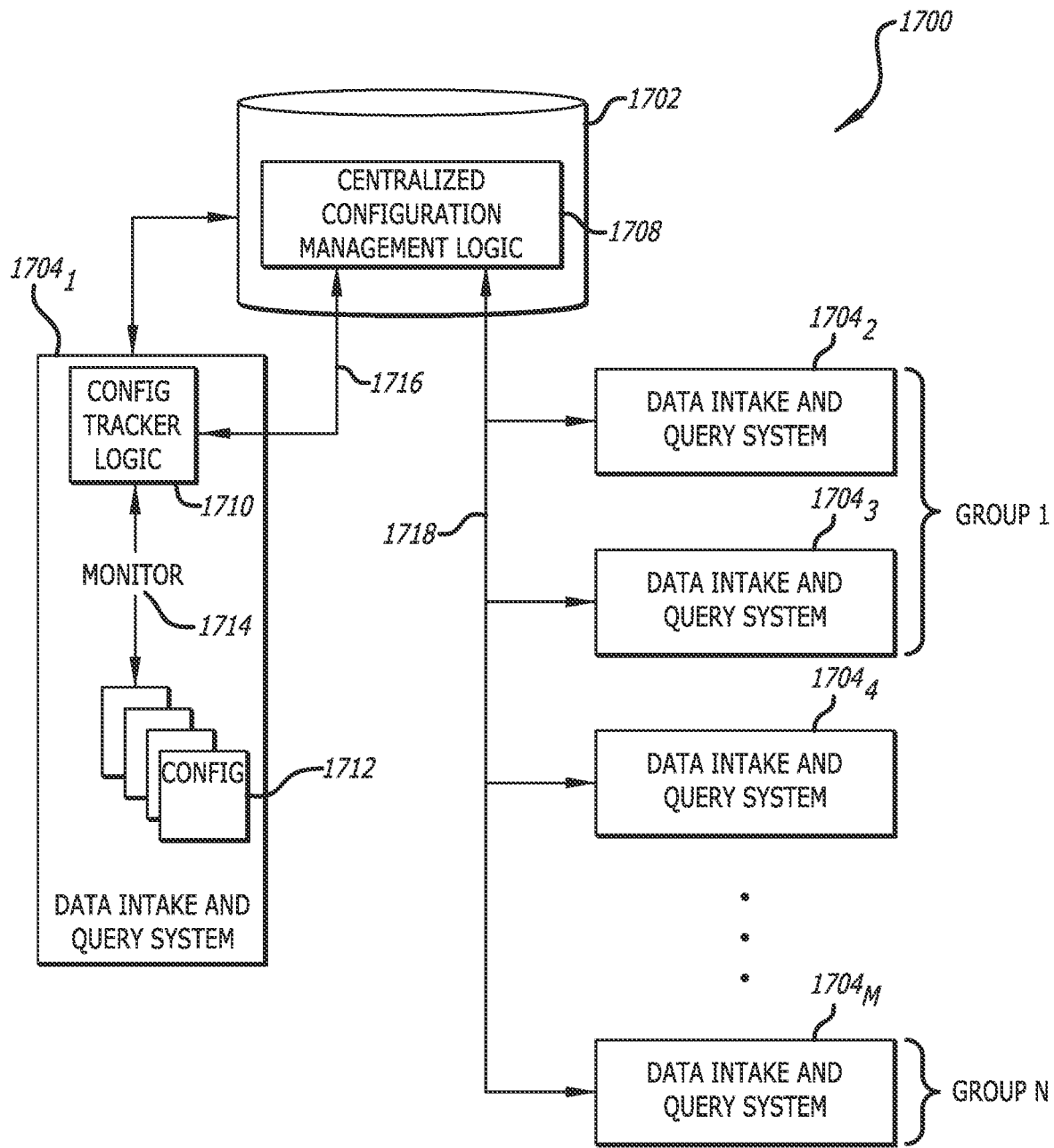
FIG. 17 is a block diagram of an example networked computer environment illustrating monitoring of changes to configuration parameters of a data intake and query system instance and propagation of instructions to remote data intake and query system instances to update respective configuration parameters, in accordance with example implementations.

In some examples, the control system 1402 may provide instructions for updating configuration parameters to specific remote instances while not providing the instructions to other remote instances. Additionally, in some examples, a first set of instructions may be provided to a first remote instance that indicates a first set of one or more configuration parameters are to be updated and a second set of instructions may be provided to a second remote instance that indicates a second set of one or more configuration parameters are to be updated, where the first and second sets of configuration parameters differ (although the sets may include some overlapping parameters). Thus, in some examples, the provision of instructions to update configuration parameters may follow a group-based approach such that a first group of remote instances is provided a first set of instructions while a second group is not provided such instructions or is provided a different set of instructions. The group-based provision is illustrated in FIG. 17.

The centralized multi-instance deployment control system 1402 and each of the one or more instances $1404_1$-$1404_M$ may include various data stores (e.g., either consolidated or separate), network interface components, and any combination of hardware and/or software configured to implement the various logical components described herein. In addition, or in the alternative, the centralized multi-instance deployment control system 1402 and each of the one or more instances $1404_1$-$1404_M$ may be comprised of firmware and/or software and be configured to execute on a computing device. Each computing device may include non-transitory, computer-readable storage ("storage") that stores instructions for implementing the various components described herein, one or more hardware processors configured to execute the instructions stored in the one or more memories, and various data repositories in the storage for storing data structures utilized and manipulated by the various components.

The computing devices included in environment 1400 (e.g., on which the control system 1402 and the instances $1404_1$-$1404_M$ operate), and any environment discussed below, may be communicatively coupled over one or more networks, which broadly represent one or more LANs, WANs, cellular networks (e.g., LTE, HSPA, 3G, 4G, 5G, and other cellular technologies), and/or networks using any of wired, wireless, terrestrial microwave, and/or satellite links, and may include the public internet.

Figure 16C:
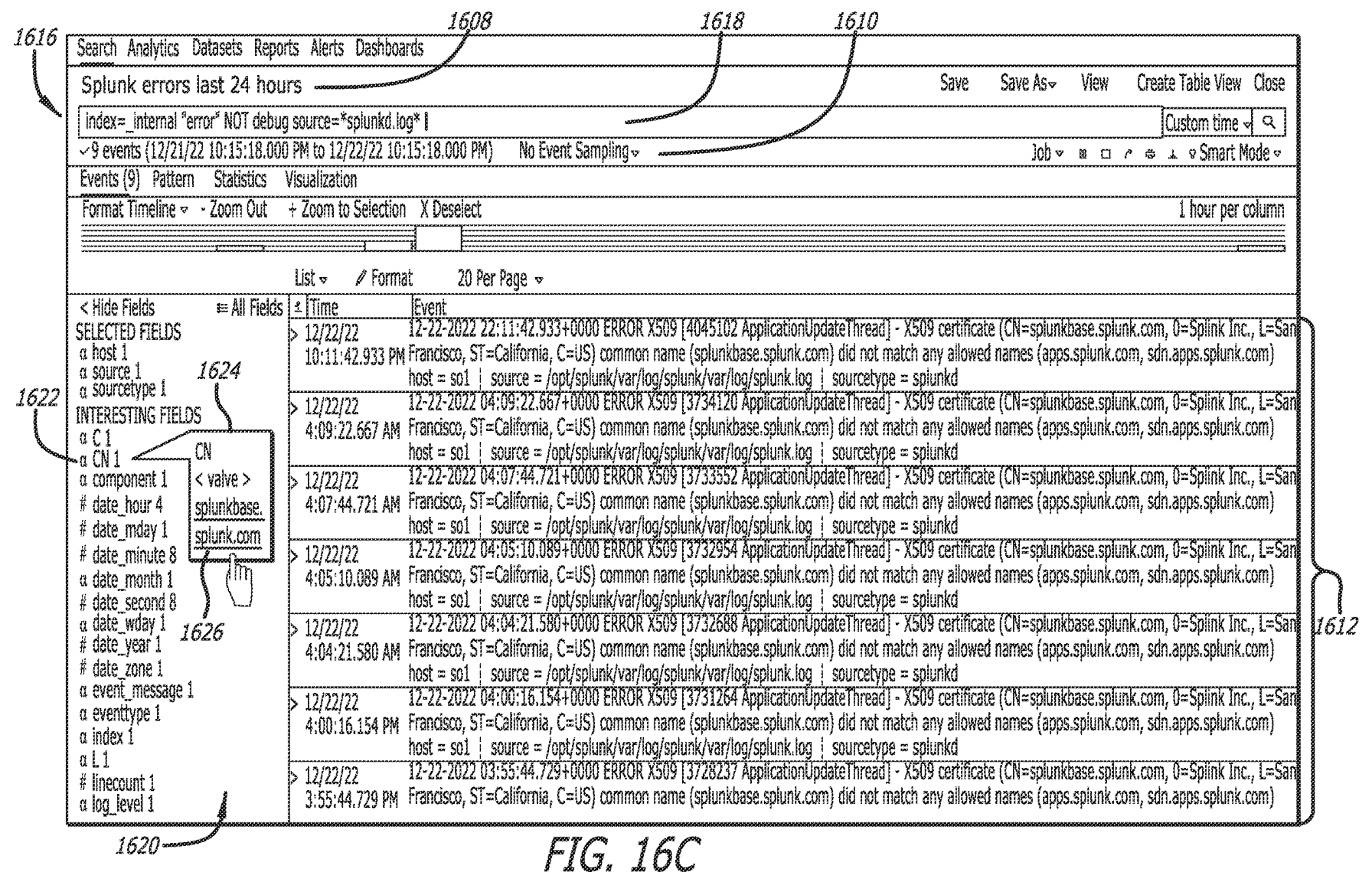
Figure 16D:
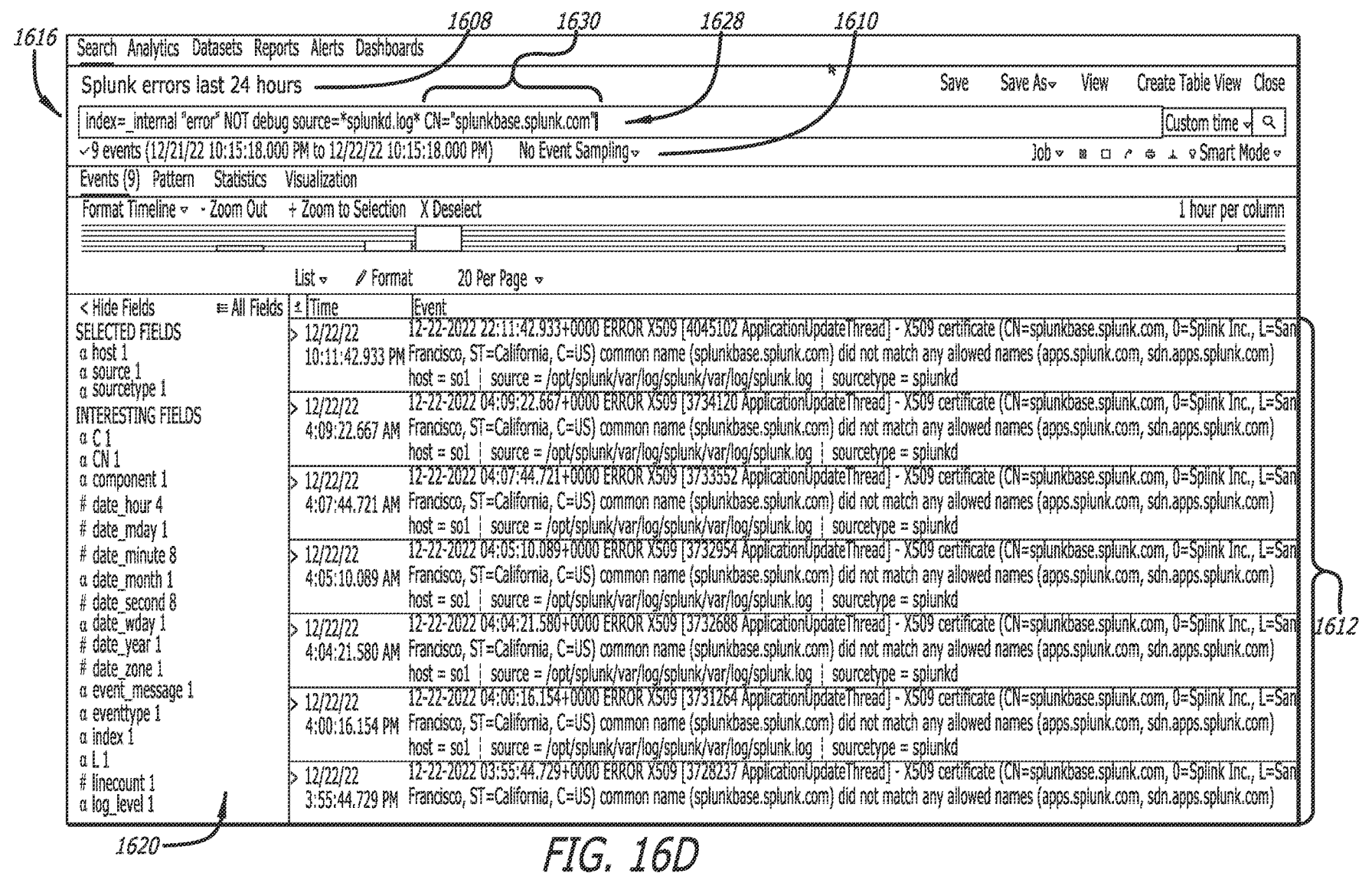

The following discussion focuses on example graphical user interfaces that may be rendered on a client device to: (1) display a recordation of configuration changes (FIG. 15); or (2) a sample process of adjusting a configuration parameter and the resulting recordation (FIGS. 16A-16E). More particularly, FIGS. 15-16E may be accessed by a user through GUIs generated by an instance having the config tracker logic processing thereon, e.g., the instance $1404_1$ of FIG. 14. As discussed above, the config tracker logic 1410 monitors changes to configuration parameters on a particular instance and the recordation of changes is obtained by the control system 1402, which then generates instructions and transmits the same to one or more remote instances, which ultimately results in the updating of configuration parameters of the one or more remote instances to be consistent with the instance $1404_1$. While the control system 1402 may automate the push/pull of configuration tracking data, e.g., recordings of changes made to configuration parameters, as well as the generation and transmission of instructions to one or more remote instances, the GUI screens provided in FIGS. 15-16E provide the functionality allowing a user to access and view the recorded changes (FIG. 15) and make the changes to the configuration parameters of the instance $1404_1$.

Referring now to FIG. 15, an interface diagram of an example user interface displaying information corresponding to configuration tracking performed on a particular data intake and query system instance is shown in accordance with example implementations. The interface 1500 of FIG. 15 represents a display screen that a user, such as an administrator, may utilize to access configuration tracking data. The GUI 1500 is shown to include a search bar 1502 that is currently populated with a search query: index="_configtracker", which may represent one methodology of retrieving the configuration tracking data. FIG. 15 illustrates content within an "Events" tab 1504, which reads "Events (2)" indicating that the search query index="_configtracker" returned two results (or "events"). The GUI 1500 is also shown to include a field listing column 1506 on the lower left-hand side and an event listing 1508 on the lower right-hand side. The field listing column 1506 illustrates selectable field names that, upon selection or a hovering-over action, display metadata associated with the fields in relation to the search query results. For example, the metadata may indicate the number of events in which the field appears.

In the configuration tracking screen as shown in FIG. 15, the event listing 1508 illustrates a listing of events that each represent a change in a configuration parameter. In some instances, the search query may be filtered according to configuration parameter changes that affected certain fields, certain reports, certain dashboards, data stored in certain databases, certain analytics, etc. In some implementations, a user may select a field set forth in the field listing column 1506, which may result in the addition of the selected field as a filter to the search query.

Referring to sample event listing 1510, FIG. 15 illustrates that an event listing may include a time column and an event column, where the time column provides a date and time that the configuration parameter change was made. The event column provides metadata associated with the configuration including a recitation of the change.

Referring to FIGS. 16A-16E, interface diagrams of example user interfaces displaying information as viewed during adjustment of a configuration parameter of a data intake and query system instance are shown in accordance with example implementations. Referring specifically to FIG. 16A, an interface diagram of an example user interface 1600 is shown that illustrates a listing of reports (or report templates) 1602 corresponding to a particular underlying search query such that generation of the report typically involves execution of the underlying search query. A report may include visualizations, statistics and/or events. As an example, the user interface 1600 may be configured to receive user input corresponding to selection of a report template. For instance, user input may be received to select sample report 1604, where user input may include activation of the name of a report (e.g., "Splunk errors last 24 hours"). In some examples, the name of the report may be a hyperlink to an additional user interface (e.g., webpage or application screen) displaying search results of the underlying search query, as seen in FIG. 16B.

Referring now to FIG. 16B, an interface diagram of an example user interface 1606 is shown that illustrates search results of the search query underlying the "Splunk errors last 24 hours" report. The user interface 1606 includes a report title 1608 and report metadata 1610, which may include a number of events comprising the search query results and a timeframe over which the search query was executed. In some implementations, the search results may be presented in the form a listing 1612 of events, with each event comprising a portion of machine data associated with a specific point in time that reflects activity in an IT environment. In some implementations, once an administrator is viewing a report, e.g., user interface 1606, the administrator may make a change to a configuration parameter of the selected report through providing user input to select the "Edit" tab 1614.

Referring to FIG. 16C, following receipt of user input indicating selection of the "Edit" tab 1614 shown in FIG. 16B, the user interface 1616 may be displayed, which presents the underlying search query 1618 within a search bar. Additionally, the user interface 1616 may also display an optional field column 1620 comprising a listing of optional fields that may be added to the search query. In some examples, each optional field may be selectable via user input, where selection may result in the field, or a term associated therewith, being added to the search query as a filter. For example, FIG. 16C illustrates a mouse icon hovering over a pop-up window 1624 and specifically the term "splunkbase@splunk.com" 1626, which is associated with the field "CN" ("Common Name"). In this example, the pop-up window 1624 may have initially appeared (or "popped-up") as a result of the mouse first hovering over the field name "CN."

Referring now to FIG. 16D, the user interface 1616 illustrates that the search query 1618 of FIG. 16C has been amended to search query 1628, which includes the addition of a filter 1630 as a result of receipt of user input selecting the term "splunkbase@splunk.com" 1626 (see FIG. 16C).

Finally, referring to FIG. 16E, the user interface 1616 illustrates a configuration tracker view of the report template "Splunk errors last 24 hours," as seen by the search term "index="_configtracker"" 1632 in the search bar. The configuration tracker view may provide one or more configuration change records, such as the sample configuration change record 1634, where each change record may be investigated (e.g., expansion of the change record to display specific change metadata). For example, the sample change record 1634 may be expanded to display the location at which the configuration file that was amended is stored, e.g., the location 1636, and a recording of the old value and the new value (collectively numeral 1638).

The change records may be provided to or retrieved by the centralized configuration management logic 1408 of the control system 1402 of FIG. 14. As discussed herein, assuming the sample change to a configuration parameter illustrated in FIGS. 16A-16E was made to a configuration parameter of a primary instance such as the instance $1404_1$ of FIG. 14, such a change may prompt the centralized configuration management logic 1408 to generate instructions to be transmitted to one or more remote instances to update their configuration parameters in a consistent manner (e.g., add the filter 1630 to the search query underlying the report "Splunk errors last 24 hours." As a result of remote instances updating their configuration parameters to be consistent with a primary instance, the "Splunk errors last 24 hours" reports generated by any of the instances will be consistent. Thus, the primary instance and remote instances will operate in a consistent manner (unless specifically instructed otherwise), without an administrator being required to manually access each remote instance and update the configuration parameters.

Referring now to FIG. 17, a block diagram of an example networked computer environment illustrating monitoring of changes to configuration parameters of a data intake and query system instance and propagation of instructions to remote data intake and query system instances to update respective configuration parameters is shown in accordance with example implementations. The networked computer environment 1700 comprises many of the same components as the networked computer environment 1400 of FIG. 14; however, many of the components have been renumbered from a 1400 series to a 1700 series. Unless a distinction is noted herein, the components of FIG. 17 include the functionality of the components of FIG. 14 having corresponding numbers.

FIG. 17 illustrates monitoring 1714 of configuration parameters set forth in configuration files 1712 of a first data intake and query system instance ("first instance") $1704_1$ by a config tracker logic 1710 operating thereon. Each change to the configuration parameters of the first instance $1704_1$ is recorded by the config tracker logic 1710, where the changes may be stored in a config data store coupled to or accessible by the first instance $1704_1$, as shown in FIG. 14. In some implementations, the config tracker logic 1710 may notify a centralized configuration management logic 1708 of the control system 1702 that a change has occurred with one or more configuration parameters of the first instance via transmission 1716. In other implementations, the transmission 1716 may represent a poll or query transmitted from the centralized configuration management logic 1708 to the config tracker logic 1710 and a response from the config tracker logic 1710 that a change has occurred. Further, in some instances, the config tracker logic 1710 provides an indication of the change as well as associated metadata (e.g., date and time of the change, user account responsible for the change, an order of configuration parameter changes if multiple, etc.). In other implementations, the config tracker logic 1710 may provide the centralized configuration management logic 1708 with access to a particular storage location at which a record of the configuration parameter change is located.

In some implementations, the centralized configuration management logic 1708 will push one or more configuration files 1712 (stored on the first remote instance $1704_1$) to any of the desired remote instances $1704_2$-$1704_M$. The retrieval of the one or more configuration files 1712 may be done via a first API call and the push to any of the desired remote instances $1704_2$-$1704_M$ may be done via a second API call. In some implementations, a user, e.g., the user making a change to one of the configuration files 1712, may specify which remote instance(s) $1704_2$-$1704_M$ are to receive the updated configuration file(s) 1712 and/or whether the remote instance(s) $1704_2$-$1704_M$ should create, delete, or update their respective configuration files upon receiving the configuration file(s) 1712 from the centralized configuration management logic 1708. In response to the instructions regarding creation, deletion, or updating, the specified remote instance(s) $1704_2$-$1704_M$ will perform operations in accordance with the received instructions and configuration file(s) 1712.

In other implementations, he centralized configuration management logic 1708 may then generate instructions for one or more remote instances $1704_1$-$1704_M$ to update its configuration parameters in accordance with the changes made to the configuration parameters of the first instance $1704_1$. Following generation of instructions by the centralized configuration management logic 1708, the instructions are then transmitted to one or more remote instances $1704_2$-$1704_M$ via transmission(s) 1718. In some implementations, the deployment of the instances $1704_1$-$1704_M$ may be such that the first instance $1704_1$ is the primary instance and the remote instances $1704_2$-$1704_M$ are secondary instances where the configuration parameters of the secondary instances are continuously updated to be consistent with those of the primary instance. In some examples, only specified configuration parameters of the one or more secondary instances are updated to be consistent with the primary instance.

In some examples, some or all of the remote instances $1704_2$-$1704_M$ are separated into groups to which particularized instructions are transmitted. For example, FIG. 17 illustrates that a first group (Group 1) comprises the remote instances $1704_2$-$1704_3$ and that a second group (Group N) comprises the remote instance $1704_M$. Additionally, the remote instance $1704_4$ is shown as not being included within a group. In some implementations, each group may be provided with particularized instructions regarding the updating of configuration parameters that may differ from those instructions provided to another group or to other remote instances, such as those not part of a specified group.

For example, following a plurality of changes to the configuration parameter of the first instance $1704_1$, Group 1 may be provided a first set of instructions indicating a first subset of the plurality of changes are to be implemented at its respective member remote instances (remote instances $1704_2$-$1704_3$), the remote instance $1704_4$ may be provided a second of instructions indicating each the plurality of changes are to be implemented thereon, and Group N may be provided a third set of instructions indicating a second subset of the plurality of changes are to be implemented at its respective member remote instances.

There are many advantages to implementing a group-based approach to distributing instructions. For example, an administrator may establish groupings of instances that are configured for different purposes, e.g., some instances may be configured to generate numerous reports and alerts (e.g., that intake critical data, such as metrics obtained from medical equipment monitoring critically ill or injured patients, or metrics obtained from military equipment monitoring an active military zone) and other instances may be configured to generate data that is less critical and less time-sensitive such that fewer reports and alerts are generated (e.g., continuous monitoring of weather stations, or CPU temperatures of computing devices of enterprise employees).

In some implementations, the centralized configuration management logic 1708 may be configured to analyze the changes to the configuration parameters of the first instance $1704_1$ and determine whether such changes are to be implemented by one or more of the remote instances $1704_2$-$1704_M$ and/or particular groups of the remote instances $1704_2$-$1704_M$. The centralized configuration management logic 1708 may have access to the current configuration files (setting forth the current configuration parameters thereof) or may store a copy of such on a local data store. The centralized configuration management logic 1708 may compare the changes in the configuration parameters of the first instance $1704_1$ to determine whether certain functionality of the remote instances $1704_2$-$1704_M$ would be affected, e.g., whether the parameter changes would affect report or alert generation of remote instances handling critical data (e.g., where such may be indicated as metadata or through other notation of each remote instance). In some implementations, the centralized configuration management logic 1708 may store a table that provides an indication as to whether certain configuration parameters of each remote instance are not to be altered.

However, even in view of the above, it should be understood that in some implementations, the instructions that, when executed by one or more processors, cause updating of configuration parameters at a remote instance may be distributed to all remote instances $1704_2$-$1704_M$.

Each of the instances $1704_1$-$1704_M$ and the control system 1702 may be implemented through execution of logic modules (program code) by one or more processors on a computing device. A computing device is an electronic device that has a memory for storing program code instructions and a hardware processor for executing the instructions. The computing device can further include other physical components, such as a network interface or components for input and output. The program code for the instances $1704_1$-$1704_m$ and control system 1702 can be stored on non-transitory computer-readable medium, such as a magnetic or optical storage disk or a flash or solid-state memory, from which the program code can be loaded into the memory of computing devices for execution. "Non-transitory" means that the computer-readable medium can retain the program code while not under power, as opposed to volatile or "transitory" memory or media that requires power in order to retain data.

In some instances, upon updating of the configuration parameters in response to receipt of the instructions from the centralized configuration management logic 1708, a remote instance $1704_1$-$1704_M$ may transmit an acknowledgement indicating successful completion of the updating of its configuration parameters. In some examples, the centralized configuration management logic 1708 may be configured to automatically retransmit the instructions to a remote instance when an acknowledgment of successfully updating the remote instance's configuration parameters has not been received within a predetermined time frame.

In some implementations, the centralized configuration management logic 1708 may include functionality to transmit an instruction to one or more remote instances $1704_1$-$1704_M$ to revert to a prior version of configuration parameters. For example, each of the config data stores $1401_1$-$1404_M$ may store a record of configuration parameter states for the associated data intake and query system $1401_1$-$1404_M$. As an example scenario, the data intake and query system $1404_2$ may receive instructions from the centralized configuration management logic 1708 to update its configuration parameters from a first state to a second state. Upon execution of the instructions, a record of the state change may be stored in the config data store $1404_2$. Subsequently, following detection that a change in the configuration parameters when moving from the first state to the second state caused an issue with alerts, reports, dashboards, etc., or was otherwise determined to be undesirable, the centralized configuration management logic 1708 may automatically transmit instructions to the data intake and query system $1404_2$ to revert to the first state.

Figure 18:
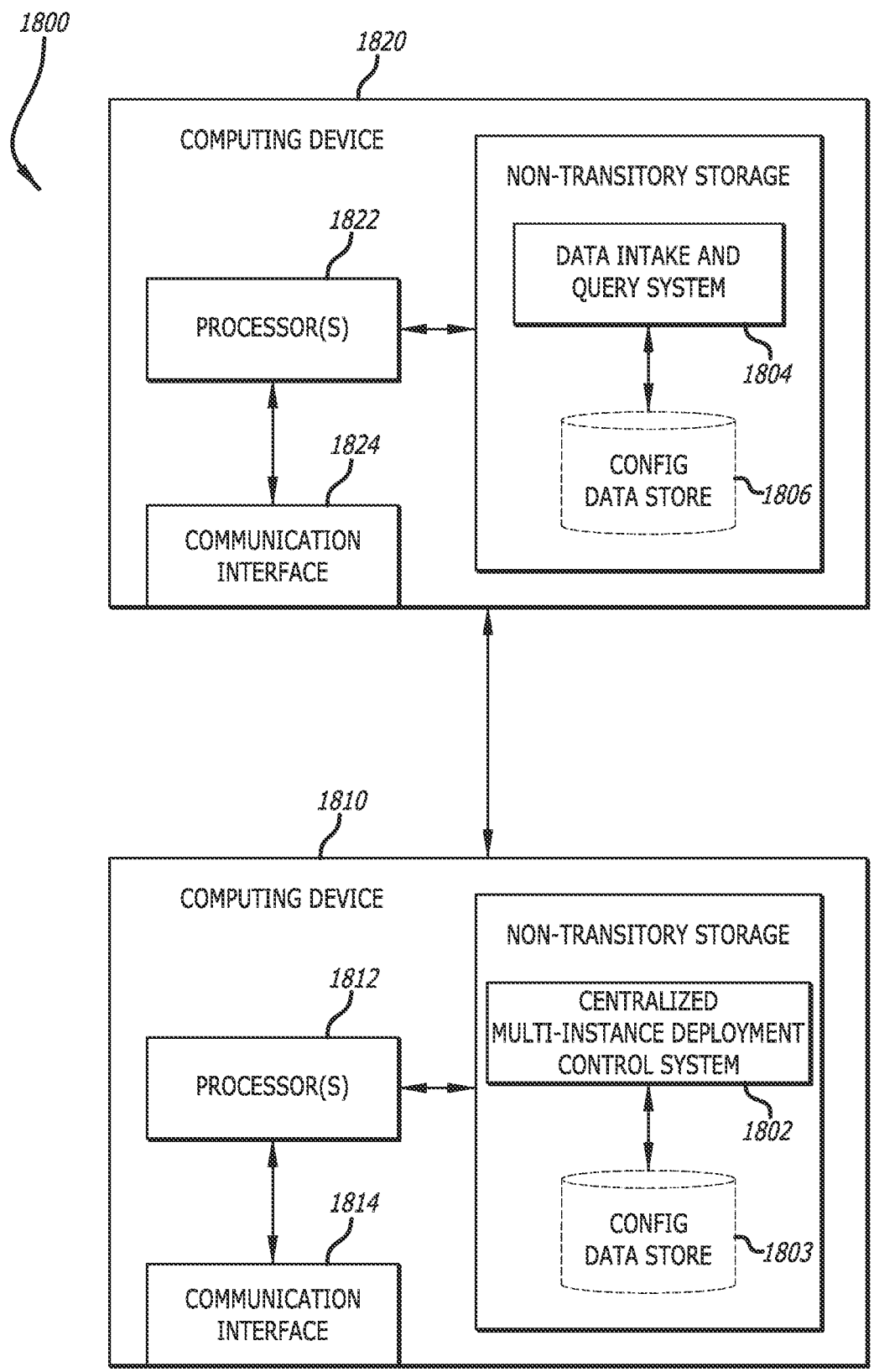
FIG. 18 is a block diagram illustrating a data intake and query system instance and a centralized multi-instance deployment control system deployed on computing devices, in accordance with some implementations.

Referring to FIG. 18, a block diagram illustrating a data intake and query system instance and a centralized multi-instance deployment control system deployed on computing devices is shown in accordance with some implementations. FIG. 18 illustrates a networked environment 1800 including both a centralized multi-instance deployment control system 1802 and the data intake and query system 1804 operating on computing devices 1810, 1820, respectively. The computing device 1810 is shown to include one or more hardware processors 1812 that are coupled to communication interface logic 1814 via a first transmission medium, wherein communication interface logic (not shown) enables communications with other computing devices via a network such as the internet. According to one embodiment of the disclosure, communication interface 1814 may be implemented as a physical interface including one or more ports for wired connectors. Additionally, or in the alternative, communication interface 1814 may be implemented with one or more radio units for supporting wireless communications with other electronic devices.

The hardware processor(s) 1812 are further coupled to non-transitory (persistent) storage via a second transmission medium. According to one embodiment of the disclosure, the persistent storage of the computing device 1812 may have stored thereon programming code (logic) comprising the centralized multi-instance deployment control system 1802 and an optional config data store 1803.

Additionally, the computing device 1820 is shown to include one or more hardware processors 1822 that are coupled to communication interface logic 1824 via a first transmission medium, wherein communication interface logic (not shown) enables communications with other computing devices via a network such as the internet. According to one embodiment of the disclosure, communication interface 1824 may be implemented as a physical interface including one or more ports for wired connectors. Additionally, or in the alternative, communication interface 1824 may be implemented with one or more radio units for supporting wireless communications with other electronic devices.

The hardware processor(s) 1822 are further coupled to non-transitory (persistent) storage via a second transmission medium. According to one embodiment of the disclosure, the persistent storage of the computing device 1822 may have stored thereon programming code (logic) comprising the data intake and query system 1804 and an optional config data store 1806. As should be understood, the data intake and query system 1804 may correspond to any of the primary or secondary instances as discussed above.

Figure 19:
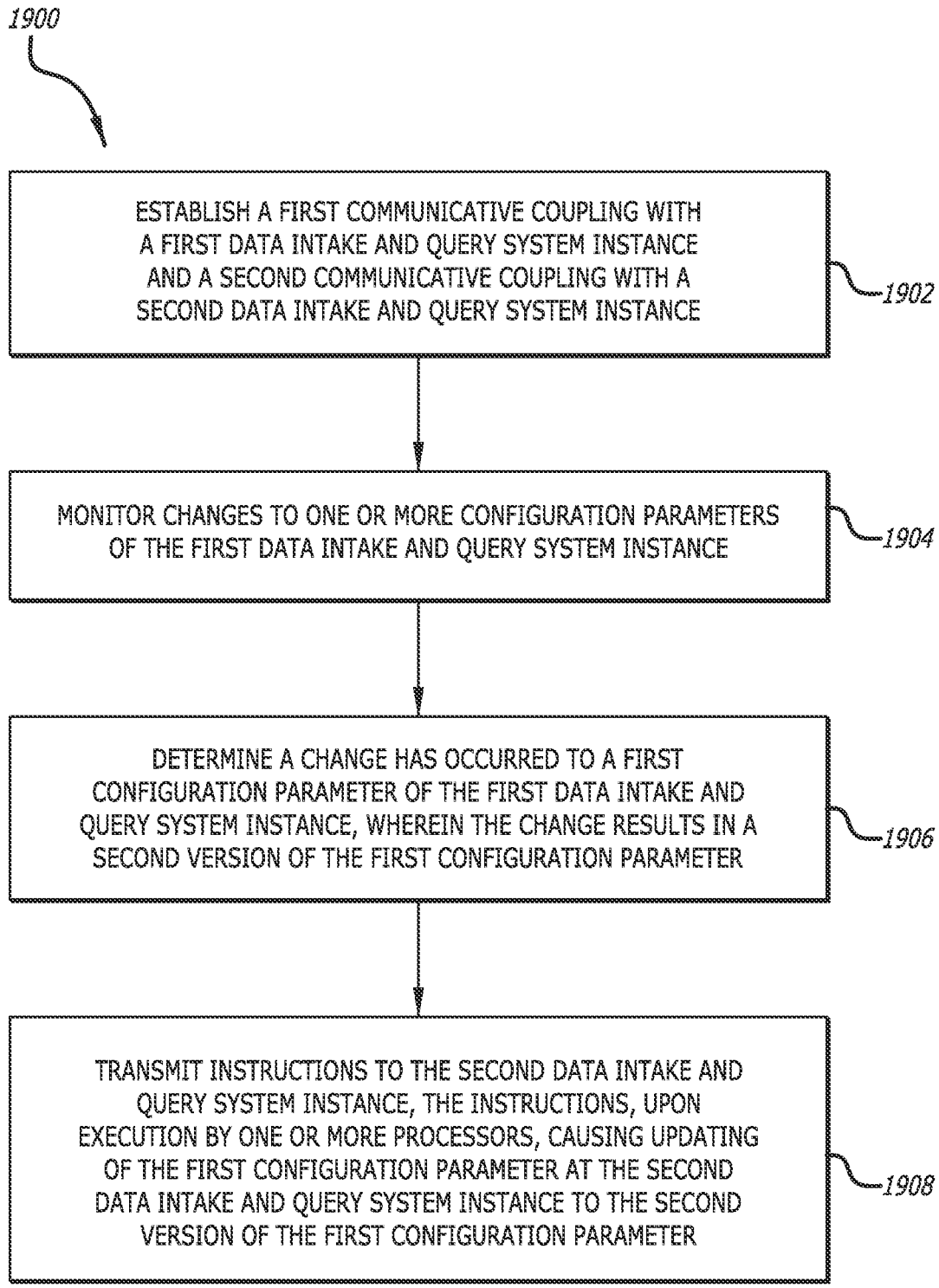
FIG. 19 is a flow diagram illustrating an implementation of a routine monitor changes to configuration parameters of a first data intake and query system instance and propagate instructions to remote data intake and query system instances responsive thereto, in accordance with some implementations.

Referring to FIG. 19, a flow diagram illustrating an implementation of a routine to monitor changes to configuration parameters of a first data intake and query system instance and propagate instructions to remote data intake and query system instances responsive thereto is shown in accordance with example implementations. Each block illustrated in FIG. 19 represents an operation performed in the method 1900. The data flow illustrated in FIG. 19 is provided for illustrative purposes only; those skilled in the art would understand that one or more of the steps of the processes illustrated in FIG. 19 may be removed or that the ordering of the steps may be changed.

The method 1900 begins when communicative couplings are established between a centralized multi-instance deployment control system ("control system") having processing thereon a centralized management logic and a plurality of data intake and query system instances ("instances"), where a first instance includes a config tracker logic processing thereon (block 1902). For instance, a first communicative coupling may be established between the control system and the first instance by provision of authenticating credentials to the first instance, thereby allowing data to be transmitted between the control system and the first instance. A similar communicative coupling may be established between the control system and the second instance (e.g., through provision of authenticating credentials to the second instance).

The method 1900 continues as the config tracker logic processing on the first instance monitors for changes to the configuration parameters of the first instance (block 1904). When a change to a first configuration parameter of the first instance is detected from a first version to a second version, instructions are generated and transmitted to the second instance, where execution of the instructions by one or more processors causes updating of the first configuration parameter of the second instance to the second version (blocks 1906, 1908). In some examples, a configuration tracker logic is processing on the first instance and monitoring changes to configuration parameters of the first instance. Upon detection of a change to the first configuration parameter, the configuration tracker logic records the change and notifies the control system. In turn, the control system generates instructions for the second instance that, upon execution by one or more processors, cause updating of the first configuration parameter of the second instance, where the first configuration parameter of each of the first and second instances refer to the same configuration parameter. The instructions are then transmitted to the second instance.

In the foregoing description, the invention is described with reference to specific exemplary implementations thereof. It will, however, be evident that various modifications and changes may be made thereto without departing from the broader spirit and scope of the invention as set forth in the appended claims.

What is claimed is:

1. A computerized method comprising:
    establishing a first communicative coupling with a first data intake and query system instance and a second communicative coupling with a second data intake and query system instance, wherein changes to one or more configuration parameters of the first data intake and query system instance are monitored;
    determining a change has occurred to a first configuration parameter of the first data intake and query system instance, wherein the change results in a second version of the first configuration parameter; and
    transmitting instructions to the second data intake and query system instance, the instructions, upon execution by one or more processors, causing updating of the first configuration parameter at the second data intake and query system instance to the second version of the first configuration parameter.

2. The computerized method of claim 1, further comprising:
    receiving an acknowledgement that updating of the first configuration parameter at the second data intake and query system instance to the second version of the first configuration parameter occurred.

3. The computerized method of claim 1, wherein monitoring changes to the one or more configuration parameters of the first data intake and query system instance is performed by a configuration tracking logic processing at the first data intake and query system instance.

4. The computerized method of claim 3, wherein the monitoring performed by the configuration tracking logic includes recording of an old value of a configuration parameter and a new value of a configuration parameter.

5. The computerized method of claim 1, wherein transmitting the instructions to the second data intake and query system instance is performed via an application programming interface (API).

6. The computerized method of claim 1, further comprising:
    establishing a third communicative coupling with a third data intake and query system instance; and
    upon determining the change has occurred to the first configuration parameter of the first data intake and query system instance wherein the change results in the second version of the first configuration parameter, transmitting the instructions to the second data intake and query system instance and the third data intake and query system instance, wherein the instructions cause updating of the first configuration parameter at the second data intake and query system instance and the third data intake and query system instance to the second version of the first configuration parameter.

7. The computerized method of claim 1, wherein the first data intake and query system instance and the second data intake and query system instance are each configured to receive raw machine data and parse the raw machine data into a plurality of timestamped events, each timestamped event in the plurality of timestamped events comprising at least a portion of the parsed raw machine data.

8. A computing device, comprising:
a processor; and
a non-transitory computer-readable medium having stored thereon instructions that, when executed by the processor, cause the processor to perform operations including:
establishing a first communicative coupling with a first data intake and query system instance and a second communicative coupling with a second data intake and query system instance, wherein changes to one or more configuration parameters of the first data intake and query system instance are monitored;
determining a change has occurred to a first configuration parameter of the first data intake and query system instance, wherein the change results in a second version of the first configuration parameter; and
transmitting instructions to the second data intake and query system instance, the instructions, upon execution by one or more processors, causing updating of the first configuration parameter at the second data intake and query system instance to the second version of the first configuration parameter.

9. The computing device of claim 8, wherein the operations further include:
receiving an acknowledgement that updating of the first configuration parameter at the second data intake and query system instance to the second version of the first configuration parameter occurred.

10. The computing device of claim 8, wherein monitoring changes to the one or more configuration parameters of the first data intake and query system instance is performed by a configuration tracking logic processing at the first data intake and query system instance.

11. The computing device of claim 10, wherein the monitoring performed by the configuration tracking logic includes recording of an old value of a configuration parameter and a new value of a configuration parameter.

12. The computing device of claim 8, wherein transmitting the instructions to the second data intake and query system instance is performed via an application programming interface (API).

13. The computing device of claim 8, wherein the operations further include:
establishing a third communicative coupling with a third data intake and query system instance; and
upon determining the change has occurred to the first configuration parameter of the first data intake and query system instance wherein the change results in the second version of the first configuration parameter, transmitting the instructions to the second data intake and query system instance and the third data intake and query system instance, wherein the instructions cause updating of the first configuration parameter at the second data intake and query system instance and the third data intake and query system instance to the second version of the first configuration parameter.

14. The computing device of claim 8, wherein the first data intake and query system instance and the second data intake and query system instance are each configured to receive raw machine data and parsing the raw machine data into a plurality of timestamped events, each timestamped event in the plurality of timestamped events comprising at least a portion of the parsed raw machine data.

15. A non-transitory computer-readable medium having stored thereon instructions that, when executed by one or more processors, cause the one or more processor to perform operations including:
establishing a first communicative coupling with a first data intake and query system instance and a second communicative coupling with a second data intake and query system instance, wherein changes to one or more configuration parameters of the first data intake and query system instance are monitored;
determining a change has occurred to a first configuration parameter of the first data intake and query system instance, wherein the change results in a second version of the first configuration parameter; and
transmitting instructions to the second data intake and query system instance, the instructions, upon execution by one or more processors, causing updating of the first configuration parameter at the second data intake and query system instance to the second version of the first configuration parameter.

16. The non-transitory computer-readable medium of claim 15, wherein the operations further include:
receiving an acknowledgement that updating of the first configuration parameter at the second data intake and query system instance to the second version of the first configuration parameter occurred.

17. The non-transitory computer-readable medium of claim 15, wherein monitoring changes to the one or more configuration parameters of the first data intake and query system instance is performed by a configuration tracking logic processing at the first data intake and query system instance.

18. The non-transitory computer-readable medium of claim 17, wherein the monitoring performed by the configuration tracking logic includes recording of an old value of a configuration parameter and a new value of a configuration parameter.

19. The non-transitory computer-readable medium of claim 15, wherein transmitting the instructions to the second data intake and query system instance is performed via an application programming interface (API).

20. The non-transitory computer-readable medium of claim 15, wherein the operations further include:
establishing a third communicative coupling with a third data intake and query system instance; and
upon determining the change has occurred to the first configuration parameter of the first data intake and query system instance wherein the change results in the second version of the first configuration parameter, transmitting the instructions to the second data intake and query system instance and the third data intake and query system instance, wherein the instructions cause updating of the first configuration parameter at the second data intake and query system instance and the third data intake and query system instance to the second version of the first configuration parameter.

* * * * *